United States Patent
Davidson

(10) Patent No.: US 8,199,935 B2
(45) Date of Patent: Jun. 12, 2012

(54) METHOD, A SYSTEM AND AN APPARATUS FOR DELIVERING MEDIA LAYERS

(75) Inventor: Yaniv Davidson, Amikam (IL)

(73) Assignee: Digital Layers Inc., Amikam (IL)

( * ) Notice: Subject to any disclaimer, the term of this patent is extended or adjusted under 35 U.S.C. 154(b) by 1068 days.

(21) Appl. No.: 11/991,963

(22) PCT Filed: Aug. 9, 2006

(86) PCT No.: PCT/IL2006/000921
§ 371 (c)(1),
(2), (4) Date: Mar. 13, 2008

(87) PCT Pub. No.: WO2007/031985
PCT Pub. Date: Mar. 22, 2007

(65) Prior Publication Data
US 2009/0116668 A1 May 7, 2009

Related U.S. Application Data

(60) Provisional application No. 60/716,952, filed on Sep. 15, 2005.

(51) Int. Cl.
*H04B 1/00* (2006.01)
(52) U.S. Cl. .......................................... 381/119; 700/94
(58) Field of Classification Search .................. 381/119; 700/94
See application file for complete search history.

(56) References Cited

U.S. PATENT DOCUMENTS

| 5,969,719 | A | 10/1999 | Tsujimoto |
| 7,313,814 | B2 * | 12/2007 | Zhu et al. ........................... 726/6 |
| 2001/0029832 | A1 | 10/2001 | Kanda et al. |
| 2002/0099789 | A1 | 7/2002 | Rudolph |
| 2002/0186844 | A1 | 12/2002 | Levy et al. |
| 2003/0014496 | A1 | 1/2003 | Spencer et al. |
| 2004/0150663 | A1 | 8/2004 | Kim |
| 2004/0196972 | A1 | 10/2004 | Zhu et al. |
| 2005/0091339 | A1 | 4/2005 | Rudolph |
| 2007/0156770 | A1 | 7/2007 | Espelien |

FOREIGN PATENT DOCUMENTS

| CN | 1149795 | 5/1997 |
| CN | 1535014 | 10/2004 |
| JP | 2001-229281 | 8/2001 |
| WO | WO 01/25948 | 4/2001 |
| WO | WO 03/015075 | 2/2003 |
| WO | WO 2007/031985 | 3/2007 |

OTHER PUBLICATIONS

Examiner's Report Dated Jan. 11, 2011 From the Australian Government, IP Australia Re. Application No. 2006290272.
Response Dated Apr. 12, 2010 to Office Action of Nov. 19, 2009 From the State Intellectual Property Office of the People's Republic of China Re.: Application No. 200680042695.3.

(Continued)

*Primary Examiner* — Douglas Menz

(57) ABSTRACT

A system for facilitating access to multiple layer media items over communication network. The system comprises a media database which is used for storing multiple layer media items as independently accessible channels. The system further comprises plurality of subscriber applications which are connecting via a communication network, e.g. The Internet, to the media database. Users can use the subscriber application to access to each channel of the multiple layer media items independently.

28 Claims, 13 Drawing Sheets

OTHER PUBLICATIONS

Response Dated Jul. 27, 2010 to Examination Report Dated Oct. 13, 2009 From the Intellectual Property Office of New Zealand Re.: Application No. 567362.
Supplemenatry European Search Report and the European Search Opinion Dated Feb. 11, 2011 From the European Patent Office Re. Application No. 06766221.3.
Herpel "Elementary Stream Management in MPEG-4", IEEE Transactions on Circuits and Systems for Video Technology, XP011014552, 9(2): 315-324, Mar. 1, 1999. Chapter I, Section II.C, Section IV.B, Chapter V, Fig.6.
ITU "Text of ISO/IEC 21000-5 CD—Part 5: Rights Expression Language", ITU Study Group 16—Video Coping Experts Group—ISO/IEC MPEG & ITU-TVCEG(ISO/IEC JTC1/SC29/WG11 and ITU-T SG16 Q6), XP030012360, No. N4942, Jul. 29, 2002. Chap.3, 4, Annex A.
Communication Pursuant to Rules 70(2) and 70a (2) EPC and Reference to Rule 39(1) EPC Dated Mar. 1, 2011 From the European Patent Office Re. Application No. 06766221.3.
Response Dated Jul. 25, 2011 to Office Action of May 25, 2011 From the State Intellectual Property Office of the People's Republic of China Re.: Application No. 200680042695.3.
Response Dated Jul. 26, 2011 to Communication Pursuant to Rules 70(2) and 70a (2) EPC and Reference to Rule 39(1) EPC of Mar. 1, 2011 From the European Patent Office Re. Application No. 06766221.3.
Office Action Dated May 11, 2008 From the Israeli Patent Office Re.: Application No. 190125.
International Preliminary Report on Patentability Dated Mar. 27, 2008 From the International Bureau of WIPO Re.: Application No. PCT/IL2006/000921.
Official Action Dated May 11, 2008 From the Israeli Patent Office Re.: Application No. 190125.
Examination Report Under Section 18(3) Dated Feb. 10, 2009 From the Intellectual Property Office of the United Kingdom Re.: Application No. GB0806835.5.
Examination Report Under Section 18(3) Dated Jun. 25, 2009 From the Intellectual Property Office of the United Kingdom Re.: Application No. GB0806835.5.
Office Action Dated Jul. 2, 2009 From the Israeli Patent Office Re.: Application No. 190125 and Its Translation Into English.
Office Action Dated Feb. 3, 2009 From the Israeli Patent Office Re.: Application No. 190125 and Its Translation Into English.
Office Action Dated Oct. 6, 2008 From the Israeli Patent Office Re.: Application No. 190125 and Its Translation Into English.
Examination Report Dated Oct. 13, 2009 From the Intellectual Property Office of New Zealand Re.: Application No. 567362.
International Search Report and the Written Opinion Dated Sep. 24, 2007 From the International Searching Authority Re.: Application No. PCT/IL06/00921.
Translation of Office Action Dated Nov. 19, 2009 From the State Intellectual Property Office of the People's Republic of China Re.: Application No. 200680042695.3.
Translation of Office Action Dated May 25, 2011 From the State Intellectual Property Office of the People's Republic of China Re.: Application No. 200680042695.3.
Response Dated Dec. 12, 2011 to Examiner's Report of Jan. 11, 2011 From the Australian Government, IP Australia Re. Application No. 2006290272.
Translation of Notice of Reason for Rejection Dated Jan. 6, 2012 From the Japanese Patent Office Re. Application No. 2008-530744.
Examiner's Report Dated Feb. 21, 2012 From the Australian Government, IP Australia Re. Application No. 2006290272.
Translation of Office Action Dated Feb. 13, 2012 From the State Intellectual Property Office of the People's Republic of China Re.: Application No. 200680042695.3.

* cited by examiner

METHOD, A SYSTEM AND AN APPARATUS FOR DELIVERING MEDIA LAYERS

RELATED APPLICATIONS

This Application is a National Phase of PCT Patent Application No. PCT/IL2006/000921 having International filing date of Aug. 9, 2006, which claims the benefit of U.S. Provisional Patent Application No. 60/716,952 filed on Sep. 15, 2005. The contents of the above Applications are all incorporated herein by reference.

FIELD AND BACKGROUND OF THE INVENTION

The present invention relates to a method, a system and an apparatus for Delivering Multi-Layer Media Data over Networks and a commercial system for facilitating distribution, access usage and trade of layered media items on the Internet. More particularly, but not exclusively to delivering multi-channel audio and video data over networks to remote terminals in order to facilitate the user with the ability to edit each channel separately, creating a new remix based thereupon.

As other industries in the last decade, so with the media production industry, computerization is becoming more and more important as the basis of technological advances. The computerization in the media industry led to the development of digital mixing tools and more sophisticated and more voluminous equipment that has the ability to handle a number of audio inputs, and to provide more flexibility in output. Computerization is also seen as a requirement for cost-effective competition. Manual instruments, systems, and techniques are, by comparison, increasingly more expensive to use.

Traditionally, the basic instrument of audio production has been the production mixing console, a workstation presenting an interface to a sound engineer through whom he or she may condition multiple channels of audio input, and mix the conditioned results into mono or stereo outputs for direct broadcast or for recording. A production mixing console typically presents arrays of input devices, such as switches, knobs, and faders, for an operator to set to condition and route audio signals.

In the 1980's computerization began to appear in professional recording studios. The first efforts were patchwork devices for automating manual console functions, and even today many automated consoles are analog audio consoles with digital equipment adapted to existing devices.

During the 1990's, the computer industry continuously introduced multi-media computers and mixing software, which started to replace the existing, manual, consoles, many of which have audio signal input/output capability together with animated image display capability. Such a multi-media computer generally employs a multi-window display system to display different information simultaneously and independently on different windows resulting from splitting a display screen, and plural icons are usually displayed so that an operator can activate any one of them using a mouse.

An example for such a multi-media computer is disclosed in U.S. Pat. No. 5,969,719, issued on Oct. 19, 1999, in which the disclosed computer is capable of displaying information in multiple windows and handling multiple audio signals in a manner convenient for a user.

Today, the switch to computer based applications has reduced the cost of audio mixers, enabling music hobbyists to install mixing software and hardware on their computers, allowing them to edit their own music files, mixing numbers of audio streams into one digital output and outputting their own creations at relatively low cost. In addition, this new development allows users to mix the original music tracks and video pieces of various other artists and creators with their own music pieces. Various software enable users to edit and remix various music tracks in different file formats (example for commonly used formats: MP3, WMA, WAV, M4A and OGG and to edit video (example for commonly used formats: AVI, WMV, MPEG, MOV, RAM and SWF).

The above-described progress has occurred in parallel with other important technological developments that had and still have a major influence on the music industry. In the last decade, as data compression and communication techniques advance the use of network communication for listening to music or for watching video streams and for downloading music and movies is increasing.

Various techniques for remotely selling compressed media files in digital formats are known. An example for such delivering music performance information via a communication network is disclosed in U.S. Pat. No. 6,949,704, issued on Sep. 27, 2005. In this disclosed system a plurality of clients are individually connected to a server via a communication network. The server automatically selects suitable music piece from a designated database, and delivers the thus-selected music piece to each of the clients currently connected to the server apparatus. Each client can request a desired music piece from the server apparatus.

Since, the current state of the art enables personal computer users to mix and edit audio data, hobbyist and professionals now can purchase and download music pieces via communication network using a system for delivering music piece and remix or edit the downloaded music piece or combine it with their own creations using up-to-date mixing software on their personal computer.

There are, however, problems with those copies of downloaded music pieces files. The music pieces files are usually originated from digital format files or streams. The available digital format files usually represent only one (Mono) or two (Stereo) channels of music that embodies the final mixing of the music piece.

The user cannot separately edit or access each channel that incorporates the mixed music piece. That is to say, the user can only edit or remix the music piece as a whole and cannot manipulate different audio channels that the music piece is comprised from. For example, though the guitar and the vocals are typically recorded on separate channels, the user is deprived of the ability to edit each of those channels separately since he has a single track mix that stores only the final digitally mixed output of the channels.

Another problem is that the files embody only the digitally mixed output of the audio channels. The user cannot isolate, omit, replace or duplicate any specific channel, and therefore the user is prevented from performing most of the professional editing and mixing functions.

Though the accessibility to different media files grew substantially in the last few years, hobbyists and the professionals still do not have the benefit of accessing directly chosen channels of given media items and therefore are deprived of the ability to carry out most editing and remixing functions that they would enjoy if they had direct access to the "building blocks" of the mixes.

Moreover, existing distributing systems for vending of audio and video files over telecommunication networks trade and distribute final mixed versions of the audio or video files. Moreover, existing systems are not configured to allow licensing, clearance, clearing and commerce services such as royalties' collection and copyright management of layered media items over communication networks. The basic assumption of the existing solutions is that the end user does not want to change or remix each layer of the video and audio piece separately. Accordingly, the concept of the commercialization of raw media in a form that can be remixed is not currently implemented.

Hence, there is thus a widely recognized need for, and it would be highly advantageous to have, a system and a method devoid of the above limitations.

SUMMARY OF THE INVENTION

According to one aspect of the present invention there is provided a system for facilitating access to multiple layer media items over a communication network. The system comprises a network accessible media database being usable for storing multiple layer media items such that each layer is independently accessible as a separate channel, and subscriber applications for connecting via a communication network to the media database, the subscriber application facilitating independent access to respective channels of the multiple layer media items, and usage thereof.

Preferably, the subscriber application is hosted by a computer.

Preferably, the subscriber application is hosted by a cellular phone.

Preferably, the system further comprises a subscribers listing database being usable for storing subscribers' information records comprising an access and usage rights of respective subscribers regarding each layer of the multiple layer media items.

Preferably, the access and usage rights are defined according to a respective licensing agreement.

Preferably, the layer rights database is adapted to be connected to a Digital Right Management (DRM) unit, the DRM unit being adapted to enforce the access and usage rights.

Preferably, the access and usage rights consists of the following access and usage rights: the right to download the multiple layer media items, the right to edit the multiple layer media items, the right to listen or play the multiple layer media items, the right to store a remix of channels of the multiple layer media items, the right to store the remixes on a hosting computing unit, the right to upload items to the media database, the right of redistributing the multiple layer media items, and the right to determine usage and access rights thereof.

Preferably, the subscribers listing database is usable for storing subscribers' history information regarding editing actions on at least one layer of one item of the multiple layer media items.

Preferably, the media database is operative for facilitating access of the subscriber applications to the multiple layer media items according to respective subscribers' information.

Preferably, the media database is operative for facilitating the subscriber applications with the ability to edit the multiple layer media items according to respective subscribers' information.

More preferably, the subscribers listing database being usable for storing access password for each one of the multiple layer media items.

Preferably, the subscriber application being usable for uploading multiple layer media items to the media database, updating respective subscribers' information accordingly.

More preferably, the subscribers listing database adapted to be connected to a Digital Right Management (DRM) unit, the DRM unit being adapted to enforce the access and usage rights.

More preferably, the system further comprises a community module being adapted for clustering subscribers into community clusters, using subscriber information records.

More preferably, the subscribers listing database is configured to allow access to the media database according to the community clusters.

Preferably, the subscriber application further comprising a mixing module, the mixing module being usable for digitally mixing layers of the multiple layer media items and outputting based thereon a remix representing mixed digital audio signal.

Preferably, the network accessible media database is adapted to be connected to a reconstruction module operative for receiving a mixed digital audio signal, outputting reconstructed channels based thereon and storing them as multiple layer media items.

More preferably, the mixing module being usable for digitally mixing channels of the multiple layer media items and outputting instructions representing the mixing.

Preferably, the instructions are represented in a matrix defining layer properties over time for each media layer to contribute to an overall output for the multiple layer media item.

More preferably, the subscriber application further comprises a digital display operative for displaying graphic interfaces, the graphic interfaces are operative for facilitating the subscribers with the ability to control the mixing module.

More preferably, the subscriber applications being usable for uploading the remix to the media database, the media database is usable for storing the uploaded remix.

More preferably, the subscriber application is operative for communicating with an independent audio source; wherein the mixing module is operative for mixing layers of the multiple layer media items with channels from the independent audio source.

More preferably, the subscriber application being hosted on a hosting computing unit operative for storing the remix.

More preferably, the remix being customized for a mobile phone.

Preferably, the subscriber application further comprises a search engine operative for searching the media database according to an indicia.

More preferably, the subscriber application is usable for submitting an indicia to the search engine; wherein, in response to the submission of the indicia at least one of: the separate channel of the layer of multiple layer media items, respective stream of the separate channel of the multiple layer media items or a respective link to a the separate channel of the multiple layer media items is received via the communication link accordingly.

Preferably, the subscriber application is adapted to be connected to a reconstruction module operative for receiving a mixed digital audio signal, outputting reconstructed channels based thereon.

Preferably, the server further comprises a mixing module, the mixing module being usable for digitally mixing plurality of separate channels of the multiple layer media items and outputting based thereon a remix representing mixed digital media signal.

More preferably, the mixing module being usable for digitally mixing plurality of separate channels simultaneously, the separate channels are originated from more than one of the subscriber applications.

More preferably, the communication link is operative for transferring to the subscriber applications at least one of: file of the remix, stream of the remix, and a link to the remix file hosted on the server.

More preferably, the system further comprises a subscribers listing database being usable for managing usage and access rights in relation to the multiple layer media items and the mixed digital audio signals; the server is operative for communicating with the subscribers listing database.

Preferably, the layer rights database is adapted to be connected to a Digital Right Management (DRM) unit, the DRM unit being adapted to enforce the access and usage rights.

More preferably, the usage rights are all or some of recording, fixating, listening, redistributing, viewing or editing.

More preferably, the server further comprises a search engine module operative for searching the media database.

More preferably, the subscriber application being usable for submitting an indicia to the search engine module via the communication link; wherein, in response to the submission of the indicia at least one of: respective channels of the multiple layer media item, respective stream of channels of the multiple layer media item or a respective links to channels of the multiple layer media item is received via the communication link accordingly.

Preferably, the step of providing a media database further comprising a step of providing a subscribers listing database, using the subscribers listing database for storing subscribers' access and usage rights regarding at least one layer of at least one item of the multiple layer media items; wherein the step of providing independent access is done according to respective at least one of the subscribers' information records.

More preferably, the step associating at least one of the multiple layer media items with at least one of the subscriber applications is done via a server; further comprising a step of digitally mixing the chosen layers and outputting based thereon a remix represent mixed digital media signal, transmitting to the subscriber application at least one of: file of the remix, stream of the remix file, and a link to a file of the remix.

According to another aspect of the present invention there is provided a subscriber application for facilitating access to multiple layer media items via a communication network. The subscriber application comprises a port for communicating with a media database via a communication network, and an interface configured to allow a user to address separately each layer of the multiple layer media items through a respective channel.

Preferably, the subscriber application further comprises a display operative for graphically displaying of the respective channels to allow independent adjustment for each one of the respective channels.

Preferably, the subscriber application is hosted by a cellular phone.

Preferably, the subscriber application further comprises a mixing module operative for digitally mixing the respective channels and outputting based thereon a remix.

Preferably, the subscriber application is hosted on a computing unit operative for storing the remix.

Preferably, the port being operative to communicating with a server via communication link, the server communicating with the media database.

More preferably, the server further comprising a mixing module operative for digitally mixing the respective channels and outputting based thereon a remix.

More preferably, the communication link is being usable for transmitting the subscriber application via the port at least one of: a file of the remix, stream of the file of the remix, and a link to the file of the remix.

According to another aspect of the present invention there is provided a remote sale system for facilitating access to layered media items on the Internet. The remote sale system comprises a connecting device for connecting a plurality of customer computers located at remote sites to a central computer associated with a database of layered media items, a management device for allowing customers to separately access each layer from the layered media items, and a purchasing device for purchasing access and usage license regarding layered media items offered by the layered media items sale system through the use of the customer computers.

Preferably, the database is configured to receive the layered media items from copyright owners' databases.

Preferably, the connecting device comprises a Digital Right Management (DRM) module.

Preferably, the customers consists of at least one of the group consisting of: private customers, commercial customers, buyers, publishers, records companies, companies, music producers, musicians, composers, photographers, illustrators, animators and hobbyists.

Preferably, the management device allowing customers to access and use the layered media items according to respective licenses.

More preferably, the license consists of at least one member of the group consisting of: a license to download layered media items, a license to copy layered media items, a license to edit layered media items, a license to access layered media items, a license to allow a predetermined number of subscribers to access simultaneously layered media items, a license for publicly performing layered media items, a license for broadcasting layered media items, a license for transmitting layered media items, a license for making available to the public layered a media items, a license for distributing layered media items, or a license to play layered media items.

According to another aspect of the present invention there is provided a remixing apparatus for generating remixes of multiple layer media item. The remixing apparatus comprises: a storage for multiple layer media items, a matrix unit for a matrix defining layer properties over time for each media layer to contribute to an overall output for the multiple layer media items, and a user input for modifying the matrix, thereby allowing a user to define a remix of the multiple layer media items.

Preferably, the user input is remotely located.

Preferably, the layer properties consist of one of the following group members: gain applied to the layer, visual properties, and audible properties.

According to another aspect of the present invention there is provided a system for facilitating access to multiple layer media items originating from portable storage devices. The system comprises an authorization module for facilitating a decryption of an encrypted multiple layer media item such that each layer is independently accessible as a separate channel, and subscriber applications for connecting via a communication network to the authorization module, the subscriber application using the authorization module for facilitating independent access to layers of the encrypted multiple layer media item.

Preferably, the authorization module is configured for matching the encrypted multiple layer media items with the access and usage rights of respective subscribers before the decryption.

According to another aspect of the present invention there is provided a method of conducting a commercial activity regarding layered media files. The method comprises the steps of: a) collecting a plurality of layered media files, b) facilitating a plurality of potential customers with the ability to separately access each layer of at least one of the plurality of layered media files, and c) debiting the plurality of potential customers according to the access.

Preferably, the method further comprises a step d) of crediting copyright owners according to the access, wherein the crediting is done according to the relative ownership share of the copyright owners in the accessed layered media files.

Preferably, the facilitating of step (b) is done using communication networks.

Preferably, the facilitating of step (b) is done using media distributing channels.

Preferably, the crediting of step (d) is done according to licensing agreement between a system operator and the copyright owners.

Preferably, the collecting of step (a) is done using receiving the plurality of layered media files from copyright owners.

According to another aspect of the present invention there is provided a system for facilitating access to multiple layer media items using peer to peer connection. The system comprises a plurality of encrypted multiple layer media items stored on remote storage devices, a remotely located authorization module for facilitating a decryption of plurality of encrypted multiple layer media items such that each layer of each multiple layer media item is independently accessible as a separate channel, and a plurality of remotely located stations configured to download encrypted multiple layer media items from the remote storage devices via a peer to peer connection, the remotely located stations being configured decrypt the multiple layer media items using the authorization module.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
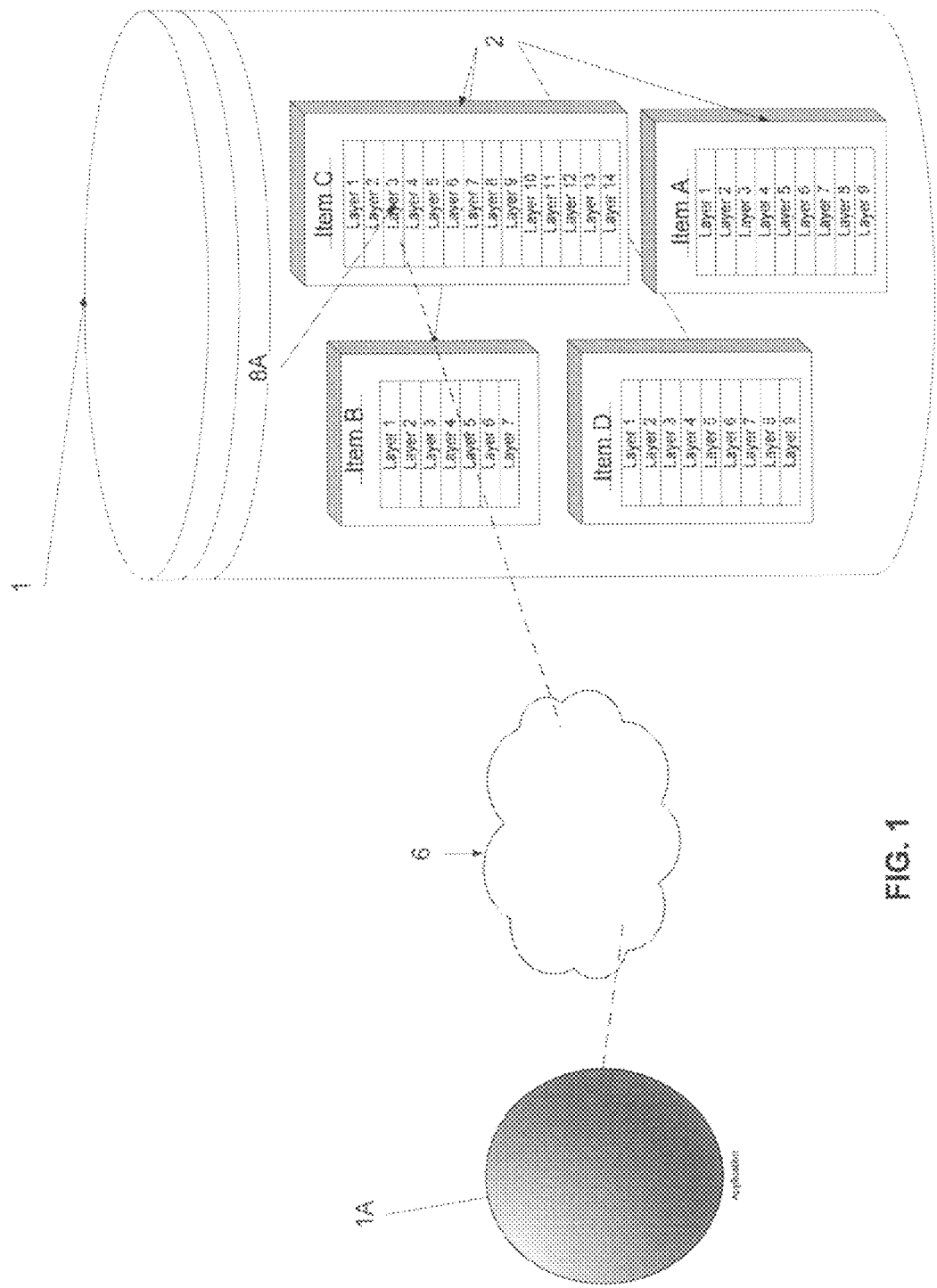
FIG. 1 is an exemplary illustration of the system according to an embodiment of the present invention.

The present embodiments comprise an apparatus, a system and a method for delivering multi-channel media data over networks and commercializing of the access, usage, distribution and trade of multi-channel media items.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The apparatus, system and method according to an embodiment of the present invention discloses a unique system for facilitating access to layers of multiple layer media items to users through communication networks, allowing users to listen, play, create remixes and to edit versions of their creation, on their private computing unit or on designated servers. The apparatus, system and method are enhanced with subscriber applications that provide users an interface to a central media database.

Layers should also be understood as tracks, audio streams, sound waves, video streams, samples or other separated media sources, etc.

Users, Customers and subscribers may include private customers, commercial customers, commercial users, buyers, publishers, records companies, companies, music producers, musicians, composers, photographers, illustrators animators, hobbyists etc.

License should also be understood as a license to copy layered media items, a license to edit layered media items, a license to access layered media items, a license to mix layered media item with other layered media items, a license to create a new media item from a layered media item, a license for publicly performing layered media items, a license for broadcasting layered media items, a license for transmitting layered media items, a license for making available to the public layered a media items, a license for distributing layered media items, and a license to play layered media items.

The database contains multiple layer media items and the user can access the database via a communication network such as the Internet, a local Ethernet, and a Virtual Private Network, wireless network, a cellular communication network etc. or the combination thereof (hereinafter: communication network). The apparatus, system and method facilitate access to the database and provide the user with the ability to access specific layers of the multiple layer media items according to the user requirements. Items should also be understood as list of items, files, batch of files, streams of information, links to files, links to streams of information etc. (hereinafter: "items").

Additionally, the system, in accordance with another preferred embodiment of the present invention, is further equipped with an authorization database, providing the system the ability to control access to the media database and usage of the layers of the layered media items. Preferably, a layer rights database and a subscribers listing database are simultaneously used for authorizing access to the media database, as described below.

In particular, the present embodiments allow the user to create digitally mixed output of chosen multiple layer media items. Users interface with the system through subscriber applications. Each user has the ability to access each layer independently as a separate channel, play, mix and edit each layer separately from the other layers of the multi-layer media item. In addition, the application supports the combination of original media streams with chosen layers from selected multiple layer media items.

Moreover, as described above the present embodiments allows the system operator to mange a database of layered media files. By managing such a database, the system operator has the ability to commodify multiple layer media items. The new commodities facilitate the customer to separately access and edit each layer of the layered media files. The present embodiments, unlike previous distribution systems and tools, allow mass distribution of layers or access to layers in separate from the media items they have been designated to be comprised in. Accordingly, an artist or a media item copyright owner can segregate the layered media items to several products. A layered media item that does not allow users to access each layer separately can be sold as one product and a layered media item having the same content that allow users to access each layer separately can be another. For example, an artist or a records company may differentiate between a media item that enables the customer to separately access each layer and a media item that stores the same content but only allows access to the mix of the layers. The layers or access to layers can be offered as a premium product or as products which is used by professional media creators. Such a mass distribution of layered media items allows the operating of new business models which has not been practiced yet.

Reference is now made to FIG. 1 which depicts an exemplary system for facilitating access to multiple layer media items over a communication network according to one embodiment of the present invention. A media database 1 is connected to a communication network 6. The media database 1 contains different multiple layer media items 2. A subscriber application 1A connects, via a communication network 6, to the media database 1. Accordingly, the subscriber application 1A facilitates independent access to specific chosen layer 8A of the multiple layer media items 2, through a respective channel via the communication network 6.

The commonly used media database stores mixed media files, each file comprises a number of mixed channels. For example, in a movie database that stores movie files, each movie file usually comprises only one or two mixed audio channels (Stereo), a video channel and occasionally a subtitles channel. Another example is a music database that stores music files. Each music file usually comprises one or two mixed channels of music that comprises many layers of music instruments and voices which where merged into them. As clearly described above, the commonly used media databases only store a final mix of the media piece. Such a database can only facilitate access to final versions of mixed layers records.

Contrary, in the aforementioned embodiment of the present invention the media database 1 stores multiple layer media items 2, each media item 2 comprises various media layers 8A. The present invention media database 1 facilitates direct access to each layer. Hence, the aforementioned embodiment can be used to edit layers separately.

Moreover, by allowing the system users to access each layer separately from the subscriber application, the system provides experts and hobbyists the ability to edit and play separately layers of media pieces from remote locations. It should be noted that playing may be understood as displaying one or more video tracks, playing one or more audio layers, or a mixture thereof.

It should be mentioned that each audio multiple layer media items, for example, can be organized in as many as 72 or even more layers to allow separate "instruments" to play and to be edit simultaneously or separately. Editing one remix of all the layers is clearly less effective and flexible than editing each layer separately.

Figure 2:
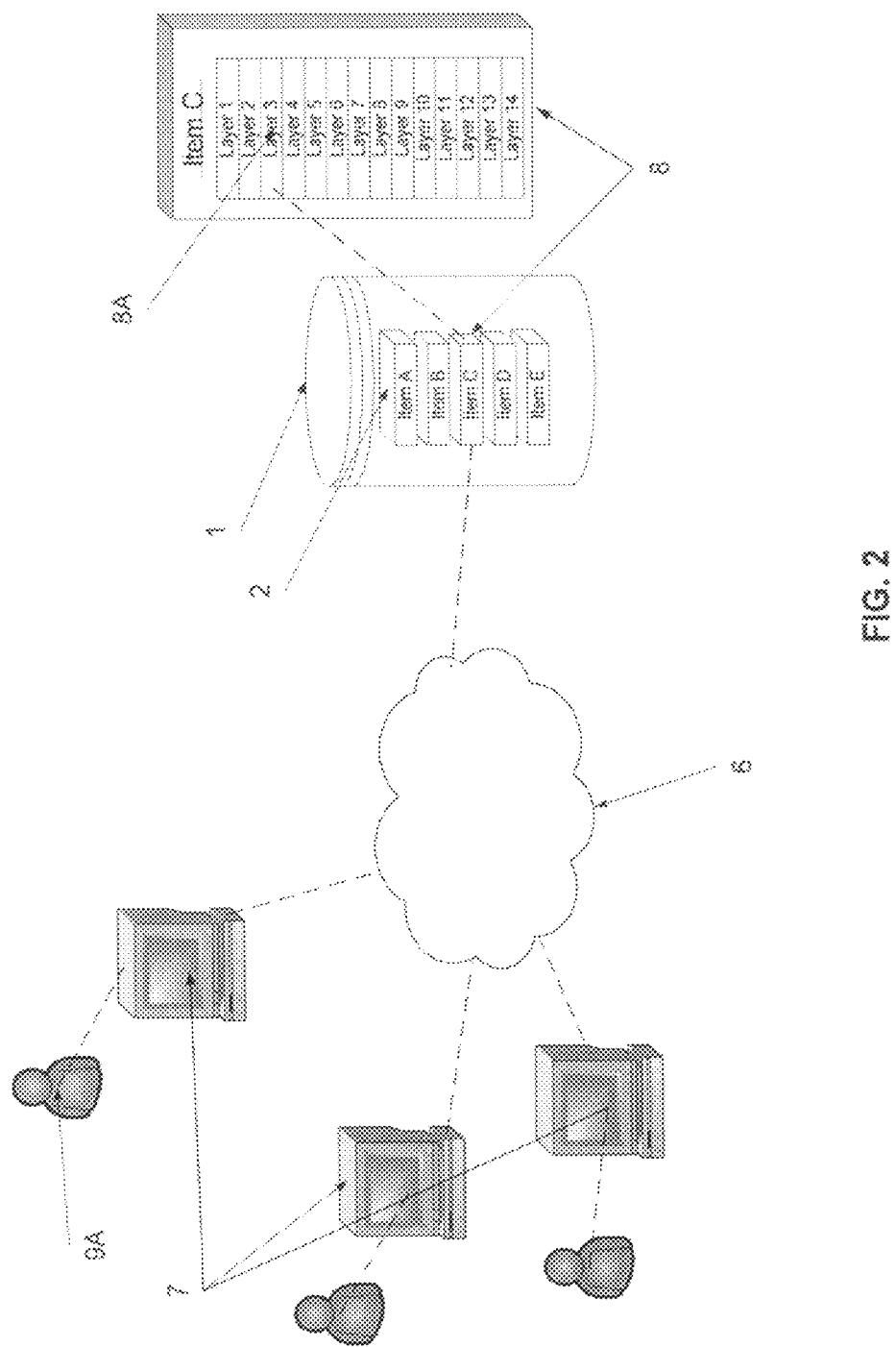
FIG. 2 is another exemplary illustration of the system according to an embodiment of the present invention the comprises plurality of subscriber applications.

Reference is now made to FIG. 2 which depicts another exemplary system for facilitating subscriber applications 7 with the access to layers of layered media items over a communication network according to another embodiment of the present invention. In this embodiment, each layer is independently accessible as a separate channel. The communication network 6 is connected to computing units 7. According to a preferred embodiment of the present invention computing units 7 are personal computers which host subscriber applications that communicate with the media database 1 through the network 6. In one preferred embodiment, each hosting computing unit 7 has a screen. The computer unit screen displays a graphical user interface (GUI) that displays an interface that facilitates inputting indicia and instructions to the subscriber applications. As is generally well known, a common mouse device and a common desktop keyboard, both connected to the computing unit, can allow users to input information and to make selections.

The way of displaying the site on the basis of the graphical user interface is well known and hence will not be described here.

In one preferred embodiment, each subscriber application is hosted by a personal computer 7 and can be used to access a chosen layer 8A in a chosen multi-layer item 8 through the communication network according to the user 9A inputs.

Figure 3:
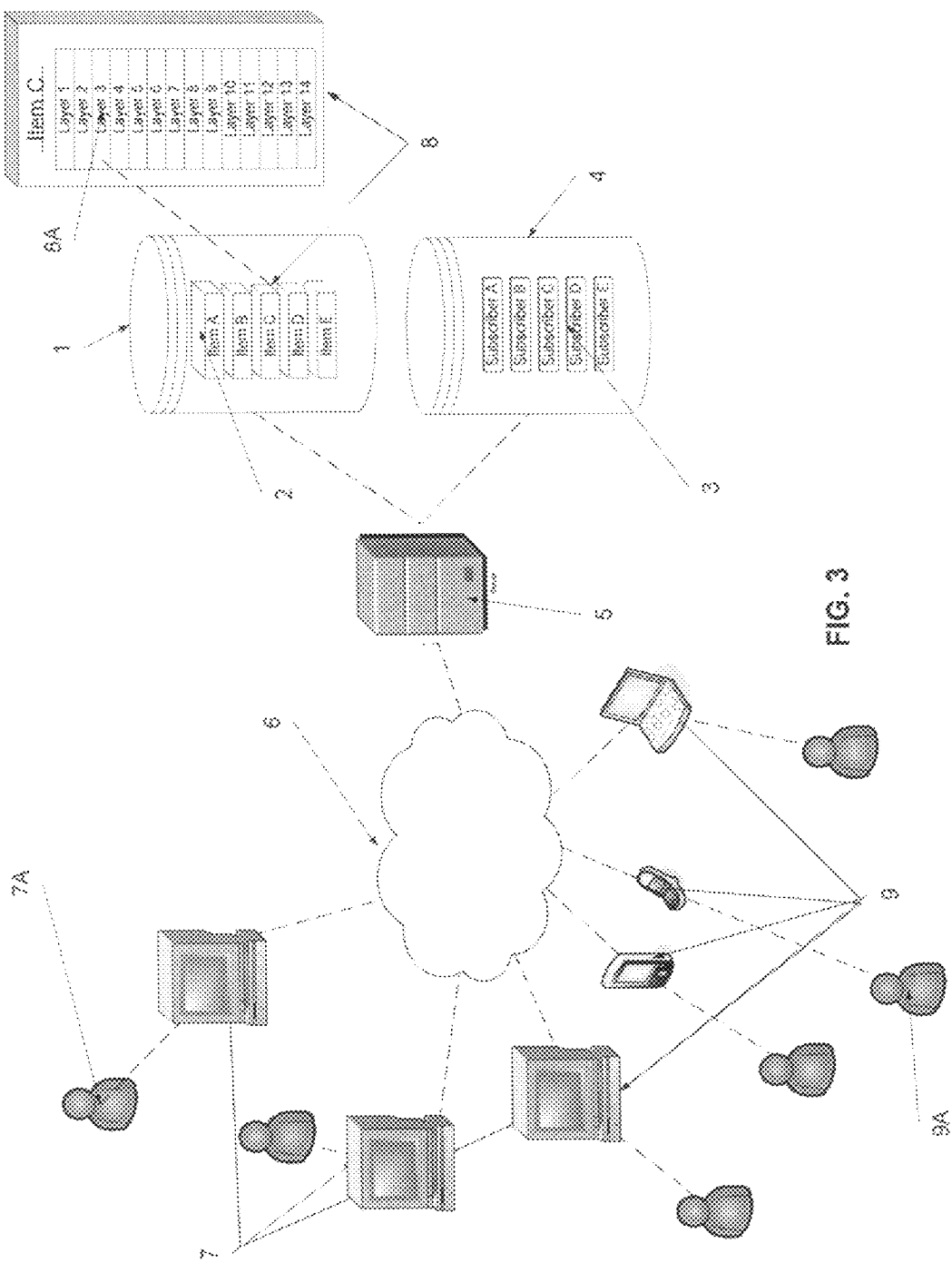
FIG. 3 is another exemplary illustration of the system according to another embodiment of the present invention.

Reference is now made to FIG. 3, which depicts another exemplary preferred embodiment of the present invention. The media database 1, the network 6 and the user applications 7 are as in FIG. 2 above however in the present embodiment a number of further components and entities are added. In this preferred embodiment the system further comprises a central server 5. The central server 5 communicates directly with the media database 1 and with each subscriber application's computing unit 7 9 through the communication network 6 via a communication link. In addition, in another preferred embodiment of the present invention the central server 5 directly communicates with a subscribers listing database 4. The subscribers listing database 4 stores information regarding subscribers 7A 9A in respective records 3. In a preferred embodiment of the invention, the information relates to access and usage rights of subscribers to different items and layers in the media database 1. Such access and usage rights may include copying, deleting, recording, listening, fixating, viewing, changing, editing, redistributing, trading, etc.

Using the subscribers listing database 4, the system operator can manage access rights of different users in relation to different media items and control the users' usage with the media items. In one preferred embodiment of the invention, the system operator can use the subscribers listing database 4 to differentiate between system users, for example to distinguish between subscribed and non-subscribed users or between different levels of subscribed users. The system allows subscribed users who have logged in the system to download chosen layers from specific layered media item. Furthermore, the system also facilitates subscribed-users with the ability to access directly channels of specific layered media items, and with the ability to initiate streaming of each channel separately. In the same manner, using the subscribers listing database records, the system can identify the non-subscriber users facilitating them with limited access to the media database or with partial rights of all or some of: usage, edit, access rights, redistributing and trading as will be elaborated below.

Figure 4:
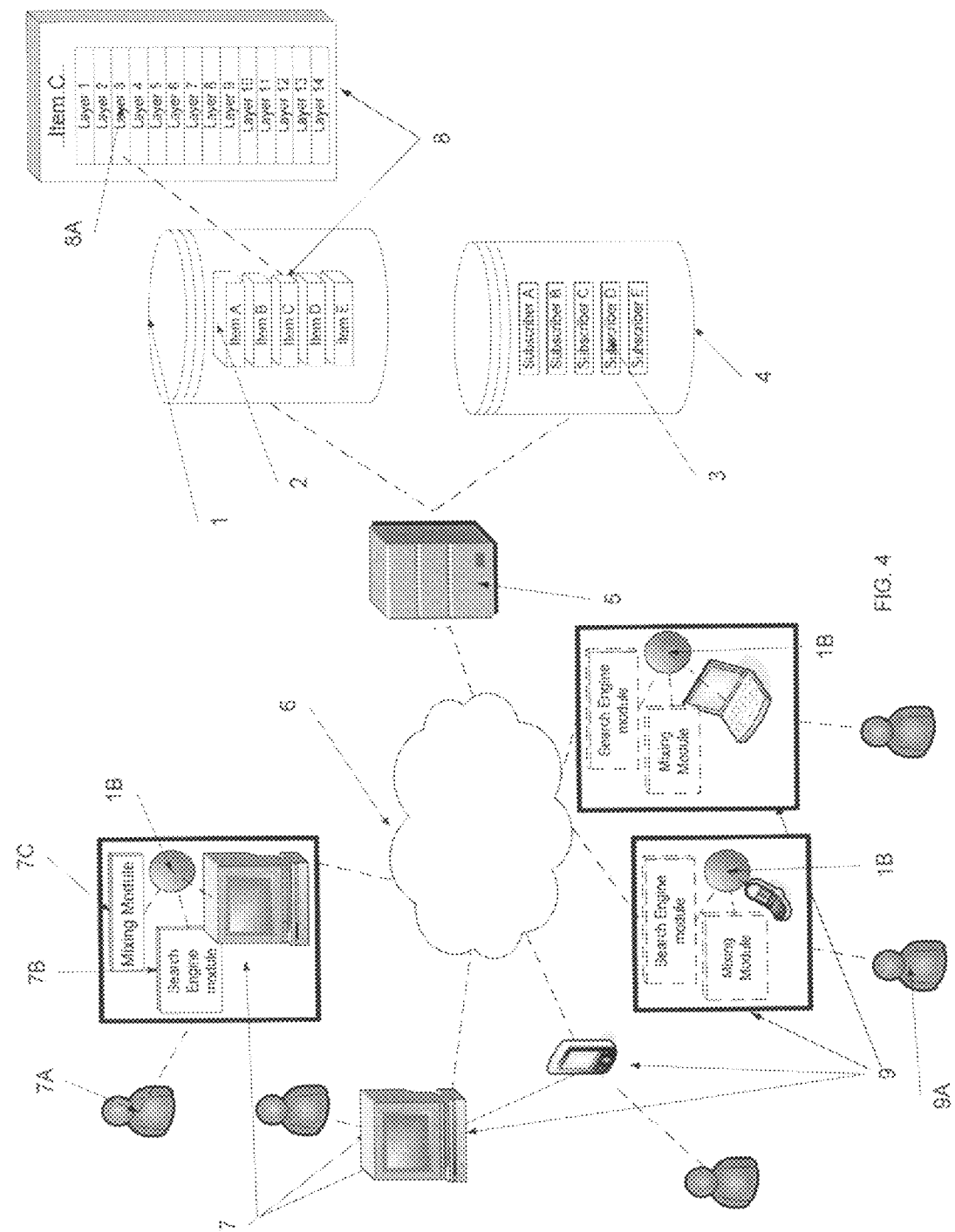
FIG. 4 is another exemplary illustration of the system according to another embodiment of the present invention that further comprises a mixer module and search engine located on a hosting computing unit.

Reference is now made to FIG. 4, which depicts another exemplary preferred embodiment of the present invention. The media database 1 and the network 6 are as in FIG. 2 above however, in the present embodiment part of the system computing actions are done on the hosting computing units 7 9. The subscriber application 1B functions as a client station, facilitating users 7A 9A with the ability to access to the media database 1. The subscriber application 1B can be hosted on various computing units 7 9, such as the personal computer, personal digital assistant (PDA), cellular phone or any other computing unit 9. The subscriber applications 1B are preferably programmed with respect to properties and limitations of the different hosting computing units.

In one preferred embodiment of the present invention the system further comprises a search engine module 7B. The search engine module is either integrated with the subscriber applications 7 9 or hosted on central server 5 and communicates with the subscriber application 1B via the communication link. In this preferred embodiment, the subscriber application 1B further comprises an interface that allows the user to submit inputs, and a display that allows the search engine to present its outputs.

According to another preferred embodiment of the present invention, the subscriber application further comprises a mixing module 7C. The mixing module 7C provides the user with the option to edit each layer 8A separately.

The term editing should be understood to include the concepts of mixing, changing, adding gain, confining properties within certain minimum and maximum thresholds etc.

The ability to access and edit each channel 8A, separately facilitates the application 1B to digitally edit chosen channels and output a digital remix based thereon which represents a user made mix of the different channels.

For example, in one preferred embodiment of the present invention the subscriber applications access channels of specific layered media item. Each subscriber application comprises a mixing module which mixes the accessed channels, outputting a single track based thereon that remixes the channels.

Preferably, users 7A 9A can utilize the mixing module 7C to digitally edit chosen channels and to output editing instructions file based thereon. Such editing instructions file represents digital editing made by the user. Preferably, the editing instructions file represents the deviation between the original channels 8A of the layered media item and the edited channels. For example, if the relative volume of a certain channel X is turned up by 5 db in a certain time interval, the respective editing instructions indicate +5 db gain in channel X at the respective time interval.

Subsequently, the editing instructions file can be used, together with the original layered media item which is used as a reference for editing instructions, to create a remix that represents a remix of the original audio channels.

Preferably the editing instructions file comprises a matrix that represents the changes between the original set of channels and the mixed set of channels at different sequential time units. The matrix is an algebraic representation of the deviation in different editable parameters between the original channels of the layered media item and the edited channels in different sequential time units.

In this embodiment, using the matrix with the related original layered media item, allows the creation of a new mixed media item.

Using such an embodiment can reduce the memory capacity of each remix. Another advantage of such an embodiment of the invention is that the media database can be used to store the instructions in a history vector. The use in such a vector can allow users to track the changes which were made to each channel separately, since each instructions file represents the deviation between the pre-edited channels and the edited channels. Comparing a late subsequent record on the history vector with a preceding vector can easily reveal the differences between them.

Preferably, the instructions file can be sent separately from the related original layered media item.

Hence, the layered media item can be downloaded to the memory of the computing unit 7 9 when the subscriber has access to a wide bandwidth network and the related instruction file can be downloaded when the subscriber has access only to a constrained bandwidth network.

For example, a user can download the layered media item to his personal computer and upload it to his mobile phone or PDA. Later, the user can access the media database 1 via the cellular network and download a related instruction file which has, as described above, relatively small size. Such an embodiment facilitates the users with the ability to download an up-to-date instruction file to their mobile phone or PDA even without downloading the related layered media items.

The mixing output can be recorded and stored either within the memory of the subscriber application hosting computing unit 7 9 or on a designated server or on the media database 1 as will be detailed below.

In another preferred embodiment of the invention the user can use the subscriber application to integrate audio or video channels that originate from independent sources such as a Compact Disk (CD) player, Digital Versatile Disk (DVD) player or sound card input port etc. with channels originating from the media database and store the output as described below. Thus, the user can integrate his tracks into existing music and thus replace or enhance a specific performer or a specific musical instrument.

This preferred embodiment can be especially useful as a learning mechanism. A student who is learning how to play a certain musical instrument or to sing can use this preferred embodiment to integrate his performances into the mix together with, or in place of the parallel music instrument channel or singing channel. By doing so, the student can compare his own outputted remix with the original mix and to evaluate his performances accordingly.

In addition, the student can use the present embodiment to isolate a specific channel. By doing so, the student can more easily notice musical nuances which are typically hidden when listening to a single track that remixes many music channels.

Figure 5:
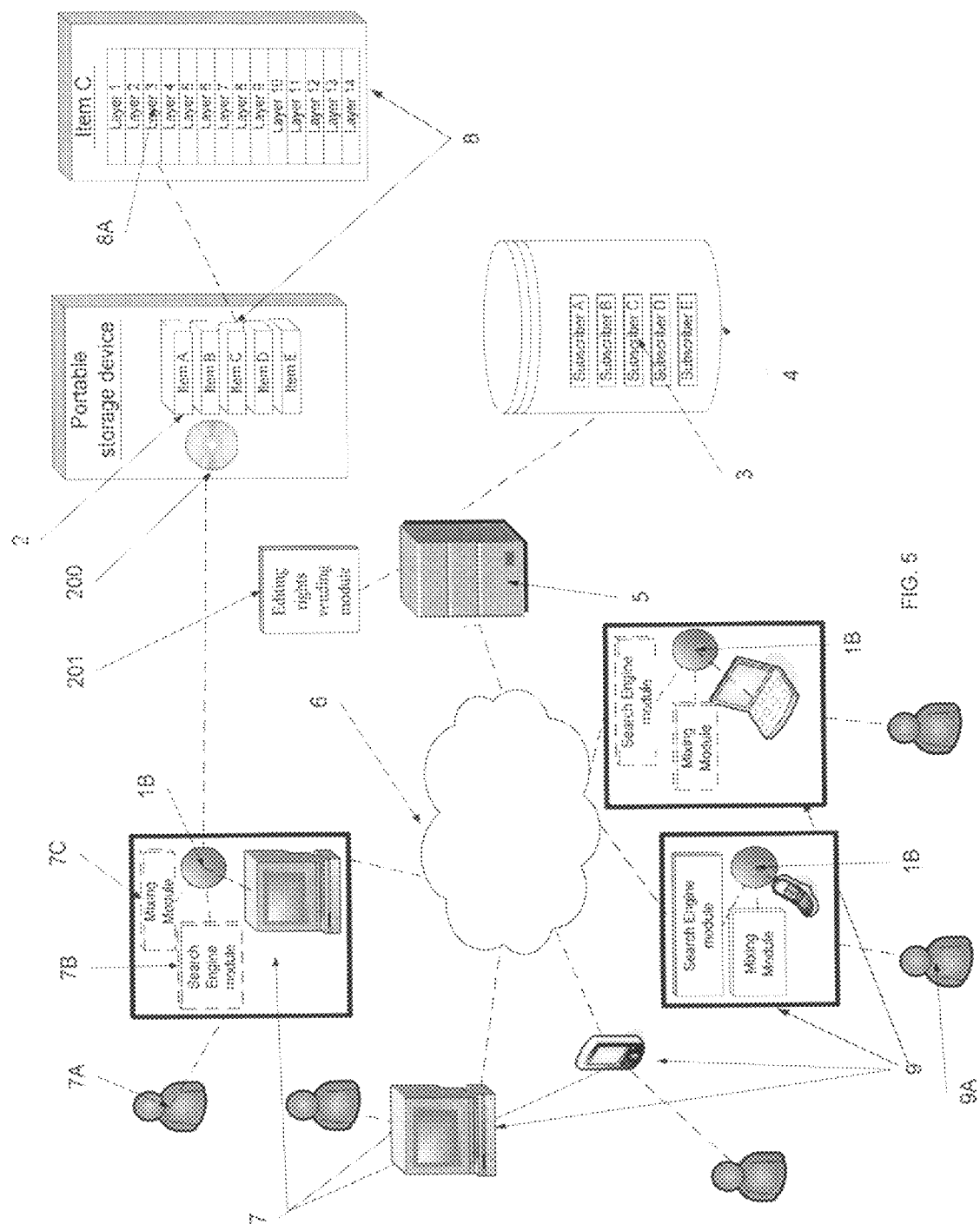
FIG. 5 is another exemplary illustration of the system according to another embodiment of the present invention in which the multi layered items are originated from a portable storage device.

Reference is now made to FIG. 5, which depicts another exemplary preferred embodiment of the present invention. The multi layered items 8, the hosting computing units 7 9 and the network 6 are as in FIG. 4 above however, in the present embodiment multi layered items 8 are originated from a portable storage device 200, and the central server 5 further comprises an editing rights vending module 201. As described above, one preferred embodiment of the present invention discloses a unique system for facilitating access to layers of multiple layer media items to users through communication networks. However, communication networks are only one method for distributing the multi layered media items. In another preferred embodiment the multi layered media items are distributed on portable storage devices such as CD, DVD, and flash memory drives such as CompactFlash™ card, SmartMedia™ card, Memory Stick™ card, Secure Digital™ card, MiniSD™ card, MicroSD™ card, and any type of USB based flash memory drive (disk on key). Preferably, the portable storage device is distributed to subscribers via common media distribution channels such as media stores and websites for distributing media items, such as audio and video items.

The subscriber may use the subscriber application 1B to integrate audio or video multi layered items 2 that originated from such portable storage device using designated drives. Preferably, the multi layered items from such portable storage devices may be encrypted. Digital Rights Management (DRM) technology may be used to protect the encrypted multi layered items 2 in a manner that prevent from unauthorized subscribers to access and use each layer separately. The subscriber application 1B is configured to decrypt the encrypted multi layered items according to several authorization procedures. Preferably, in one authorization procedure the subscriber application 1B communicates via the central server 5 with a subscribers listing database 4. As described above, the subscribers listing database 4 stores information regarding subscribers 7A 9A in respective records 3. The subscriber application 1B is configured to verify the usage and access rights of the related subscriber, according to the respective records 3, as described above. In another authorization procedure the subscriber application 1B allows the related subscriber 7A 9A to purchase the usage and access rights which inter alia, allows him to create remixes and to edit versions of his creation, on his private computing unit or on designated server, as described below.

In another authorization procedure, each multi layered item 8 is coupled with a locking file. The locking file is used to lock the multi layered item 8 to editing, preventing the editing of each layer separately. Preferably, Digital Rights Management (DRM) technology is used to lock the multi layered items 2. Preferably, the subscriber uses the subscriber application 1B to purchase an unlocking key which is used for unlocking the multi layered media items for editing. Such an embodiment facilitates the distribution of the multi layered media items via peer to peer connections using, inter alia, file sharing software. Such an embodiment reduces the system's need for wide bandwidth and increased computational power for the distribution of the multi layered media items. Since locking file is used to lock the multi layered items 8, as described above, the users can download the multi layered items 8 via the peer to peer connections. In such a manner the multi layered items are downloaded to the user's computational device from one or more other computational devices or from one or more servers. After the user downloads the multi layered item 8 to his device, he may separately purchase the unlocking key or unlocking file from the system operator.

Figure 6:
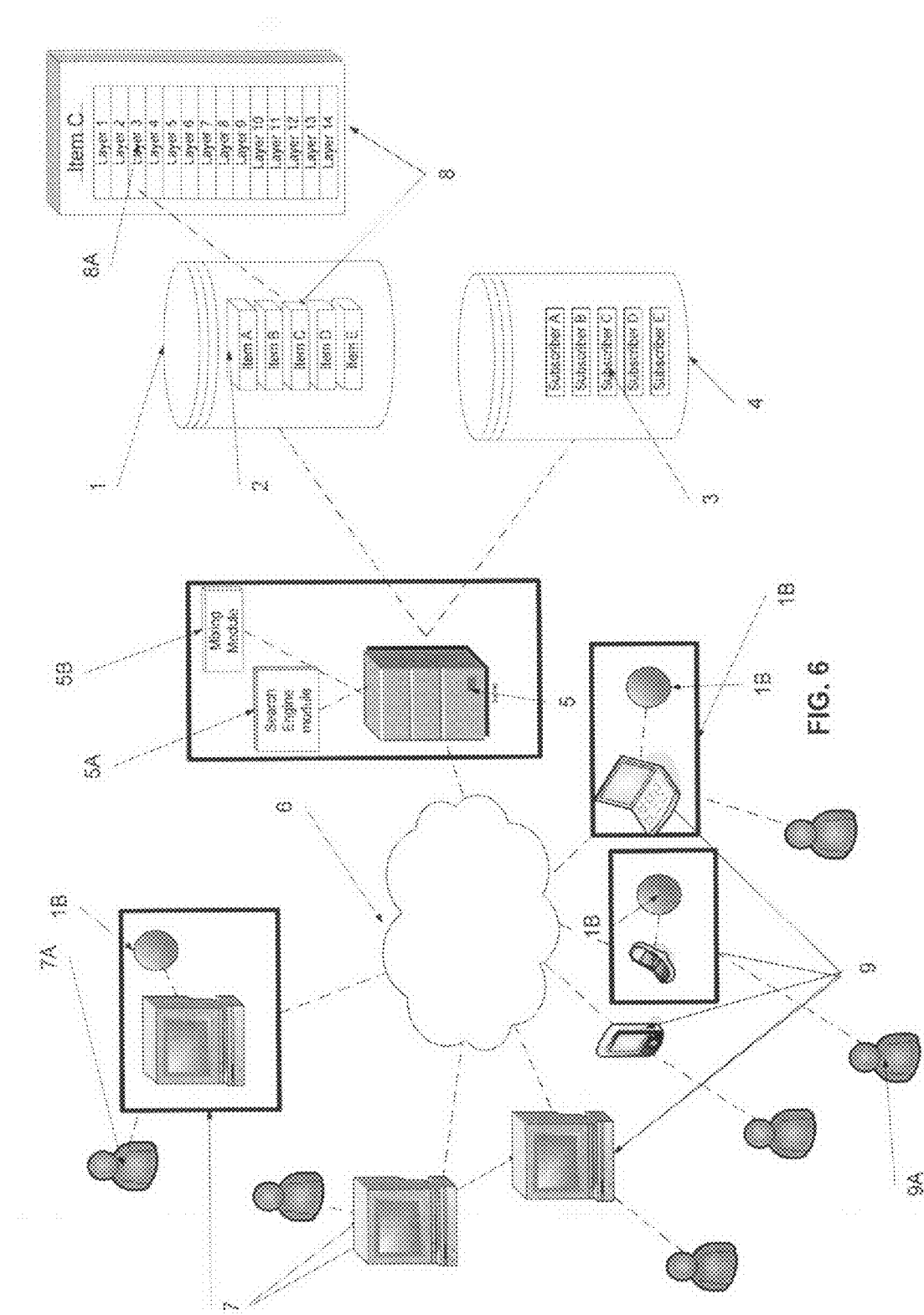
FIG. 6 is another exemplary illustration of the system according to another embodiment of the present invention that further comprises a mixer module and search engine located on a central server unit.

Reference is now made to FIG. 6, which depicts another exemplary preferred embodiment of the present invention. The media database 1, the network 6 and the subscribers listing database 4 are as in FIG. 4 above, however the mixer module 5B and the search engine 5A are not located at the subscriber application 1B, but on central server 5.

In this preferred embodiment, users 7A 9A can access a designated internet site, stored in a central server 5, using different client apparatus 7 9, via the communication network 6. In one preferred embodiment the site is managed as HTML (Hyper Text Markup Language) files that display information forming a basis for creation of Web pages that facilitating the access to the media database 1. The way of displaying the site on the basis of the HTML file is well known and hence will not be described here.

Preferably, as the user accesses the site using a client apparatus 7 9, the client apparatus 7 9 automatically receives a web page or an applet. The user can use the web pages or the applet to access channels of layered media items 2 stored in the media database 1. In the present embodiment of the invention, the site integrates a mixing module 5B facilitating the mixing and the editing of specific channels 8A by users as described above. Since the mixing module 5B is hosted on a central server 5 as described in the present embodiment of the present invention the mixing and editing are done on the server 5 itself. Therefore, the mixing module 5B outputs are controlled by the central server 5. Thus, the system operator can configure the system in a manner that only subscribed users can file or store the mixing module 5B outputs and other users are deprived of such a right. Thus, non-subscribed-users can experience samples of the system performance and ability, yet have to subscribe in order to enjoy the full system availability, inter alia, controlling the outputs of the mixing module.

Figure 7:
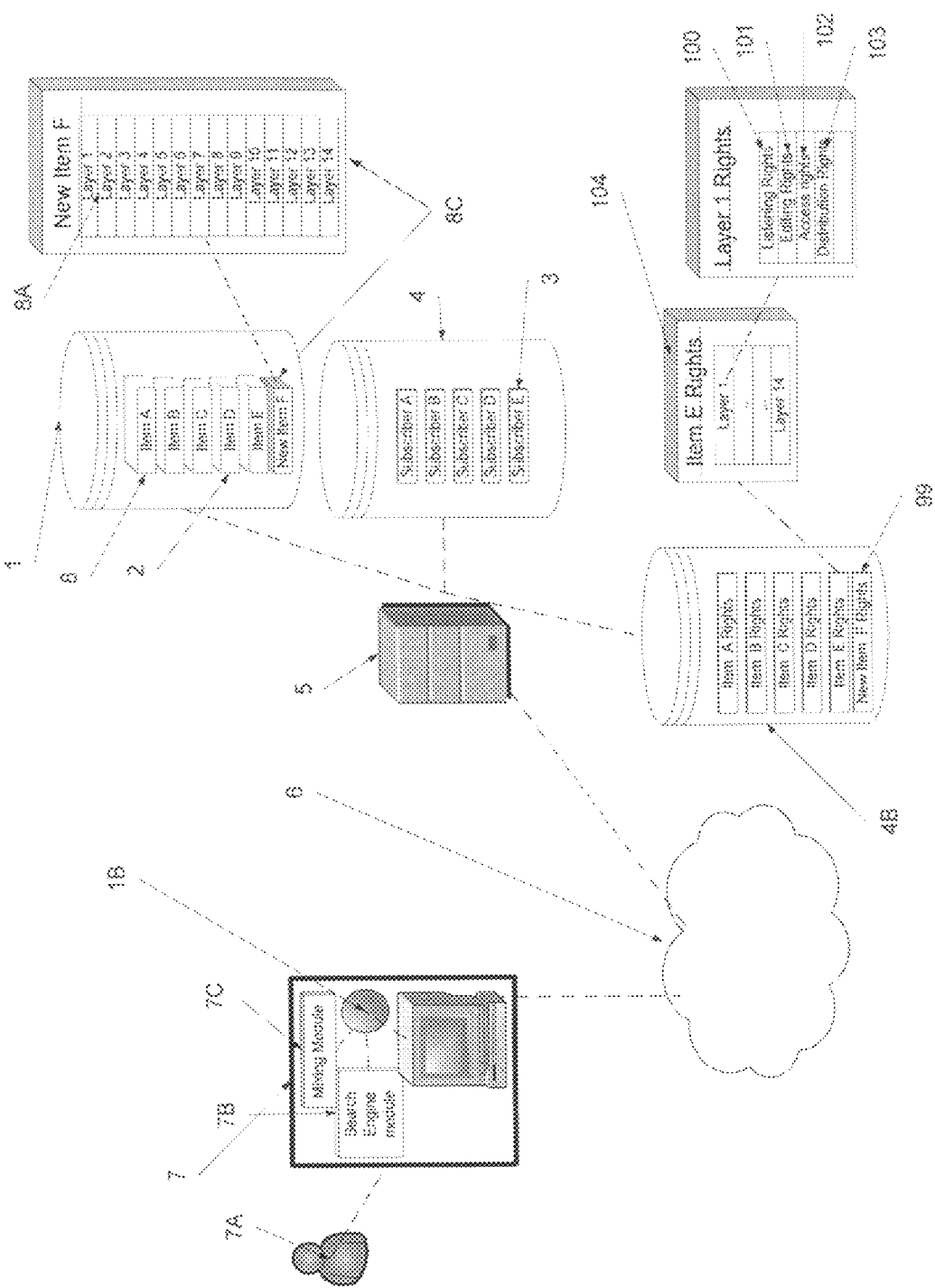
FIG. 7 is another exemplary illustration of the system according to another embodiment of the present invention depicts uploading files to the media database.

Reference is now made to FIG. 7, which depicts another exemplary preferred embodiment of the present invention. The subscriber application 1B, the subscriber application computing unit 7, media database 1, subscribers listing database 4 and the network 6 are as described in FIG. 4 above. However, FIG. 7 further depicts a layer rights database 4B. The layer rights database 4B stores information regarding rights which are associated with each item and layer 8A of the media database 1.

The system enables an ability to mix different media layers. Each media layer may have different copyright owners. Such an embodiment creates a complicated ownership situation since the multi-layer items may have multiple copyright owners. It should be noted that copyright may be understood as copying rights, replication rights, reproduction rights, duplication rights, printing rights, synchronization rights publication rights, minting rights, recording rights, modification rights, conversion rights, adaptation rights, performance rights, broadcasting rights, phonographic rights, producers rights, neighboring rights, etc.

Preferably, each record of the layer rights database 4B includes a definition of the listening rights 100, the editing rights 101, access rights 102, and distribution rights 103 of the related media item or media layer.

The layer rights database 4B enables the system operator to separately define different access and usage rights to each layer of the multi layered items 2 of the media database 1. The system operator may define the access and usage rights of each layer to reflect the licensing agreement with the layer copyright owner(s).

In use, when a subscriber requests to access or to use a certain multi layered item, the defined access and usage rights of each requested layer are verified using the layer rights database 4B records. Thus, the terms set for licensing specific layers by the different copyright owners are met. The access and usage rights regarding each layer are separately assessed according to a related record of the layer rights database 4B.

For example, if a subscriber tries to remix a multi layered media item, and some of the layers have limited editing rights, the subscriber is respectively prevented from editing some of the layers but allowed to edit others.

Preferably, the access and usage rights which are represented in each record of the layer rights database 4B can be defined according to an agreement or an arrangement between the copyright one or more owners of the media item or the layer to the system operator or according to general instructions of the copyright owner(s). Different rules and privileges can be determined to reflect different agreements with different copyright owners. For example, layer rights database 4B can limit subscribers to receive only playing rights according to a certain predefined arrangement between the system operator and the copyright owner. Editing, remixing and creating copies which can be redistributed can also be defined as usage rights, as described above.

The records of the layer rights database 4B and the subscribers listing database 4 may include conditional terms. Such conditional terms may define conditions for the granting of access and usage rights. For example the geographical positioning of the requesting subscriber or the belonging of the requesting subscriber to a certain predefined group of subscribers or community may be defined as a conditional term.

In one example of a conditional term, the subscribers listing database 4 validates the number of subscribers which may simultaneously access the media database 1 using the same username. If the number exceeds the maximum allowed number of subscribers that the related license allows, the subscribers listing database 4 blocks access to the media database 1.

Preferably, a Digital rights management (DRM) unit is further integrated into the system. The DRM unit is configured to enforce the access and usage rights as described above.

In particular, the DRM unit has the ability to handle the description, the layering, the analysis, the valuation, the trading and the monitoring of the access and usage rights.

Examples of well-known DRM systems that can be integrated into the system are Macrovision®, FairPlay DRM®, Windows Media DRM (WMDRM)®, and OMA DRM®.

Preferably, the DRM unit, when utilized in the present embodiments facilitates one or more of the following licensing scenarios:

1. Subscription (time based) licensing model—in which the system allows access and usage of media layers and items during the subscription term. Subscription license supports different periods of time and different usage rights based on different subscription levels. Access and usage rights may be defined either for the entire media database 1 or for different sections of the media database 1 separately.
2. Ownership license—direct license acquisition that grants the purchaser expanded rights regarding specific media layers and items that can be applied for indefinite or finite terms. Ownership license supports different usage rights based on different ownership levels. Ownership levels may be defined according to time periods, number of users, number of copies, number of hosting units, type of usage and access rights etc. Such, subscription and ownership licensing models may be implemented, inter alia, using tethered downloading technologies or any other DRM model. The tethered downloading technologies are well known and hence will not be described in further detail.
3. Pay-Per-Access—in this scenario each subscriber can access media layer 8A and item 8 and pay for one access. In this scenario the subscriber cannot download or save the media layer and item 8, but merely stream and mix the item as described above.
4. Preview and Purchase Content—using the DRM unit, the system can offer users 7A 9A the option to preview media layer 8A and item 8 before purchasing them. For example, subscribers are allowed to download any media layer 8A and item 8 and play it twice in exchange for registering with the service. At the third time subscribers attempt to listen or to remix the audio item, they are given instructions on how to purchase the item.

In this scenario, the system operator is able to promote the system abilities and database while cutting down on marketing costs and using the registration information to strengthen the mailing list.

5. One File, Different Licenses—the DRM unit can offer subscribers a choice of licenses when purchasing content. For example, for a small fee, subscribers can edit the layered item for one month. For a larger fee, they can edit the layered item forever and share the layered item with friends. If they choose the latter, the subscribers listing database 4 issues a license to the friends with no expiration date that also includes the right to edit the item or just to play it.

In another preferred embodiment of the system the user can upload a multi-layer item. 8C to the media database 1. The uploaded multi-layer item 8C may be a user original creation. Each user can create remixes as depicted above and upload them to the media database 1. By doing so, the user can publish his remixes allowing other users to access them, sharing his creations with others.

Preferably, the user defines access rights 99 to his mixed record, determining either open access to the file or limited:

access to a list of chosen users or subscribers, updating the layer rights database 4B accordingly. As the uploaded remixes may contain media layers, which are copyrighted by other owners, the user defined access and usage rights 99 to his newly created multi layer item 8C, are defined in a manner that does not violate the rights of the original copyright owners or the system operator. The access and usage rights 99 are defined per each layer of the newly created multi layer item 8C.

Preferably, the user may separately define the access and usage rights to each layer of the media file.

Hence, subscribers can define the publicity of each remix or layered media item he creates. Subscribers can limit the access to and usage of the uploaded files for personal use, allowing only the subscriber himself to access and use the remix or the item. Subscribers can define the access for sharing their creations with friends or colleagues. By doing so, subscribers may define a working group for communally creating and editing remixes. Each subscriber can define access and edit rights of specific creations, facilitating a group of creators with the ability to work together on media pieces, sharing ideas and capabilities. The creator can bestow each group member with different editing rights, allowing part of the work group to access and edit his creations and others only the ability to listen to or watch his creations.

In one preferred embodiment of the invention, subscribers can facilitate access to and usage of their remixes to chosen work groups. The work groups are clustered according to specific field of interest or according to type of music.

In one preferred embodiment of the present invention the subscribers listing database 4 further comprises a community module that collects information representative of the organizational structure of a community of users of the multilayer media data system.

Preferably, the community module collects data regarding user accessed multiple layer items and about the actions users have carried out with the accessed items.

In one preferred embodiment, the community module divides different users into different communities of users according to their answers to a questionnaire that asks them about their music preferences. Preferably, the questionnaire is a web page that permits the user to answer the questionnaire online.

In another preferred embodiment, the community module divides users into different communities according to the multiple layer items they are choosing.

In one embodiment, the community module facilitates a first subscriber to initiate a community and to decide which other users to accept to the community.

Preferably, each user of a certain community can access and use items which where created by other members of the community, as described above.

Reference is now made, once again, to FIG. 6

In one preferred embodiment of the present invention the subscribers' listing database 4 further comprises a live recording module. As described above, the user may both upload and download layers using the system. Such abilities are utilized by the live recording module to enable subscribers to use the system for performing online live recording. A group of subscribed users may use the system to share their generated layers simultaneously. Thus, several subscribers can take part in a recording session even though they are remotely located one from the other. The community module is preferably used to define the members of a virtual session as a certain community that has access rights to the virtual session layers. Preferably the mixer module 5B is used to mix the different channels which have been uploaded simultaneously from different subscriber applications 7. The mixer module 5B respectively transmits the outcome to the different subscriber applications 7 which took part in the virtual session.

Preferably, the live recording module may be used for performing auditions for performing artists. In such an embodiment, a performing artist is connected to the system and online performs a sample presentation before a group of examiners which are connected to the system as described above.

Preferably, the system allows users to rank remixes, facilitating the operator to arrange remixing contests, encouraging users to upload and publish original remixes.

More preferably, subscribers can add password protection to their media records, allowing access to the item's layers through respective channels or editing rights only to subscribers who have entered the particular password when asked. More preferably, the system allows the subscribers to mark and track changes which were made by him or by different users respectively on his media items and to either accept or decline those changes.

Each creator has copyright on his remixes, and in one preferred embodiment of the present invention, the system allows users to add identification stamp to their uploaded remixes. Such an identification stamp, as traceable watermarks, would help the remix creator to trace his creation when published. The watermark can also help to distinguish one remix from another.

In another embodiment of the present invention, the subscriber application provides the user with the ability to file the mixed digital audio signal which is based on his digital mixings and to send it via the communication network to an electronic mailbox or to a designated server. Preferably, the user can send the remix file to a designated server of a distribution company or other commercial artists in order to gain commercial benefit such as a recording contract or an employment contract.

In another preferred embodiment of the present invention, the subscriber application provides users with the ability to grant access to and usage of a certain remix or a multi layered item to another user, preferably as a present. Accordingly, the user can purchase the access and usage right for other users, respectively updating users' status at the subscribers listing database 4, as described above. In this embodiment the user can send a password or a message that notifies another user that he is entitled to access the remix or the multi layered item via the communication network to the electronic mailbox of the other user.

In one preferred embodiment of the present invention, the system further comprises a licensing module. As described above, the system comprises a layer rights database 4B, which preferably stores copyright information for each layer. The system operator can facilitate automatic or semiautomatic business processes for granting access and usage rights for each layer separately. The access and usage rights are granted according to predefined agreements with the layers copyright owners.

Preferably, the licensing module enables private and business subscribers to purchase access and usage rights of individual layers. In one embodiment, the subscriber application comprises an interface that displays a graphical user interface (GUI) which is configured to provide subscribers the ability to purchase different access and usage rights of separate layers of a multilayer item. Preferably, the GUI displays a list of access and usage rights that are available for each layer. Such rights may be playing rights, editing rights, remixing rights, redistributing rights minting rights, mixing rights etc.

The displayed list is determined according to a set of rules which is preferably compatible to business agreements that a certain copyright owner of a media item sets up with the system operator. The subscriber chooses specific usage and access rights and preferably specifies whether the purpose of the purchase is commercial or private.

Based upon the subscriber inputs and the predefined rules, which are preferably being set according to the agreement between the copyright owners and the system operator, the licensing module calculates the fee for the requested usage and access rights and displays the outcome as an offer to the subscriber. Then, preferably, the system enables the subscriber either to accept the offer in whole or in parts or to decline the offer. By accepting the system offer, the subscriber obtains license for the specified access and usage of the item.

Preferably, if a certain subscriber is interested in purchasing access and usage rights for multilayer items, which are not specified in the predefined licensing terms between the copyright owners of the multilayer item and the system operator, the licensing module will act in a semiautomatic mode. In the semiautomatic mode, the licensing module generates a request that specifies the requested access and usage rights. The request is transferred to the system operator that can acquire the requested access and usage rights from the copyright owners. Such an embodiment allows the system operator to offer mediation services to the user.

In another preferred embodiment of the present innovation, the licensing module is configured to provide payment and royalties collections services for the copyright owners of the multilayer media items. As mentioned above, the layer rights database 4B preferably stores information about the copyright ownership of each layer. By using the information, the licensing module calculates the exact composition of the copyright ownership for each multi layered item. Such items may be created by mixing two or more layered media items and may also include user original layers. Preferably, the licensing module records the number of times each multi layered item has been accessed and used and calculates the proportional usage for each media item in the system. Preferably, the licensing module can determine the royalty fees that should be transferred to the copyright owner of a certain multilayer item, by multiplying the proportional usage of its item with the relative copyright ownership the specific copyright owner is entitled to in the multilayer item. The system operator may charge a certain percentage from the royalty fees for the usage of the system as a marketing platform for the subscriber's multi layered item.

In another embodiment of the present invention, the subscriber application 7 further comprises a translation module that allows users to translate their mixes into various customizable sounds available for the usage of mobile phones units such as ringtones, tritone and realtone.

Figure 8:
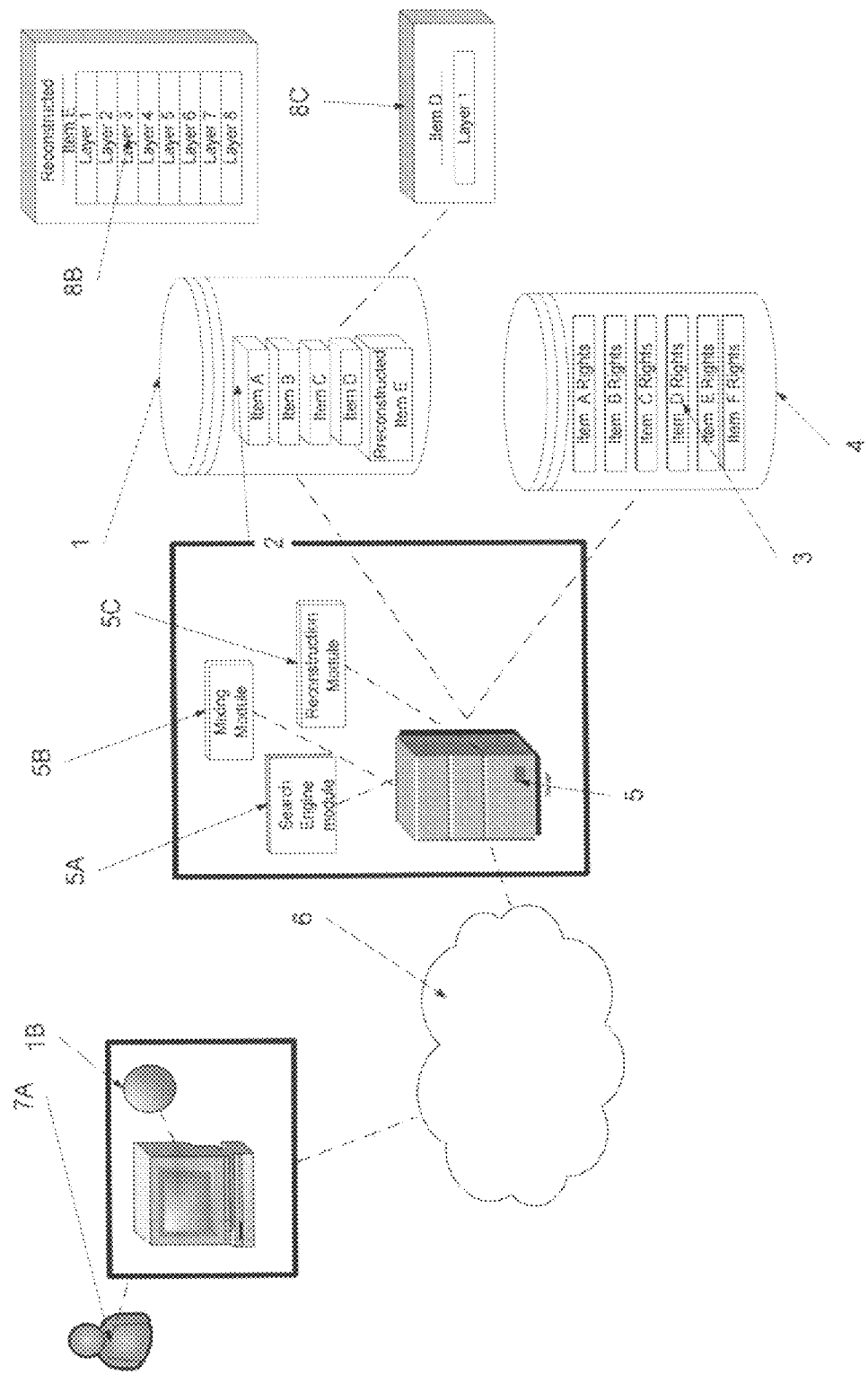
FIG. 8 is another exemplary illustration of the system according to another embodiment of the present invention that further comprises reconstruction module located on the central server.

Reference is now made to FIG. 8, which depicts another exemplary preferred embodiment of the present invention. The subscriber 7A, the subscriber applications 1B, the media database 1 and the network 6 are as described in FIG. 4 above, however the central server 5 further comprises a reconstruction module 5C.

In this embodiment, the subscriber application 1B provides users 7A with the ability to reproduce layers 8B from digitally mixed signals, using a reconstruction module 5C.

The present embodiment is particularly efficient for remixing items of old media recordings.

Recent media recordings items usually have a new master version format in which the layers of different music instruments have been recorded and are stored separately. Hence, each individual layer is independently accessible as a separate channel and can easily be made available to the system through related channels and thereby facilitates independent access to the recorded layers of each music instrument or each voice which was recorded separately.

However, old recordings items usually make use of an old master version format that stores only one channel that represents the resultant mix of all the layers of music instruments and voices.

Hence, since the layers of the music instruments or voices are all stored on the same channel, users cannot independently edit each layer of music instrument or voice.

In order to edit each layer of music instrument or voice independently, the channel that represents the resultant mix of the layers must be divided into different channels, each channel represents only one layer of one music instrument or voice.

In one preferred embodiment of the present invention the central server 5 further comprises a reconstruction module 5C. The reconstruction module 5C uses audio features for splitting channels that represent a resultant mix of different layers of music instruments and voices 8C into separate layers 8B, each layer for different music instrument or voice. Such a reconstruction module has previously been described, in U.S. Pat. No. 5,974,380, published Oct. 26, 1999.

Preferably, users can designate an item 8C from the media database 1, or upload a file to the media database 1, and use the reconstruction module 5C to output instruments and voice as separate layer 8B, each layer independently accessible as a separate channel.

Preferably, the reconstruction module 5C outputs layered media item 8B based upon the original master 8C.

Preferably, voiceprint technologies are used by the reconstruction module 5C to split different imprints of instruments or voices in the channel that represent the resultant mix of several layers into respective channels, each channel represent different layer. The imprint of each layer of instrument or the voice is identified by probing the resultant mix. The imprint is identified according to a set of measurable characteristics that uniquely identifies each one of the instruments or the voices. Preferably, these characteristics, which are based on the physical configuration of the instrument's characters, are identified using a mathematical formula that expresses sound prints.

In one preferred embodiment the split layers are saved as a layered media item 8B in the media database 1.

Figure 9:
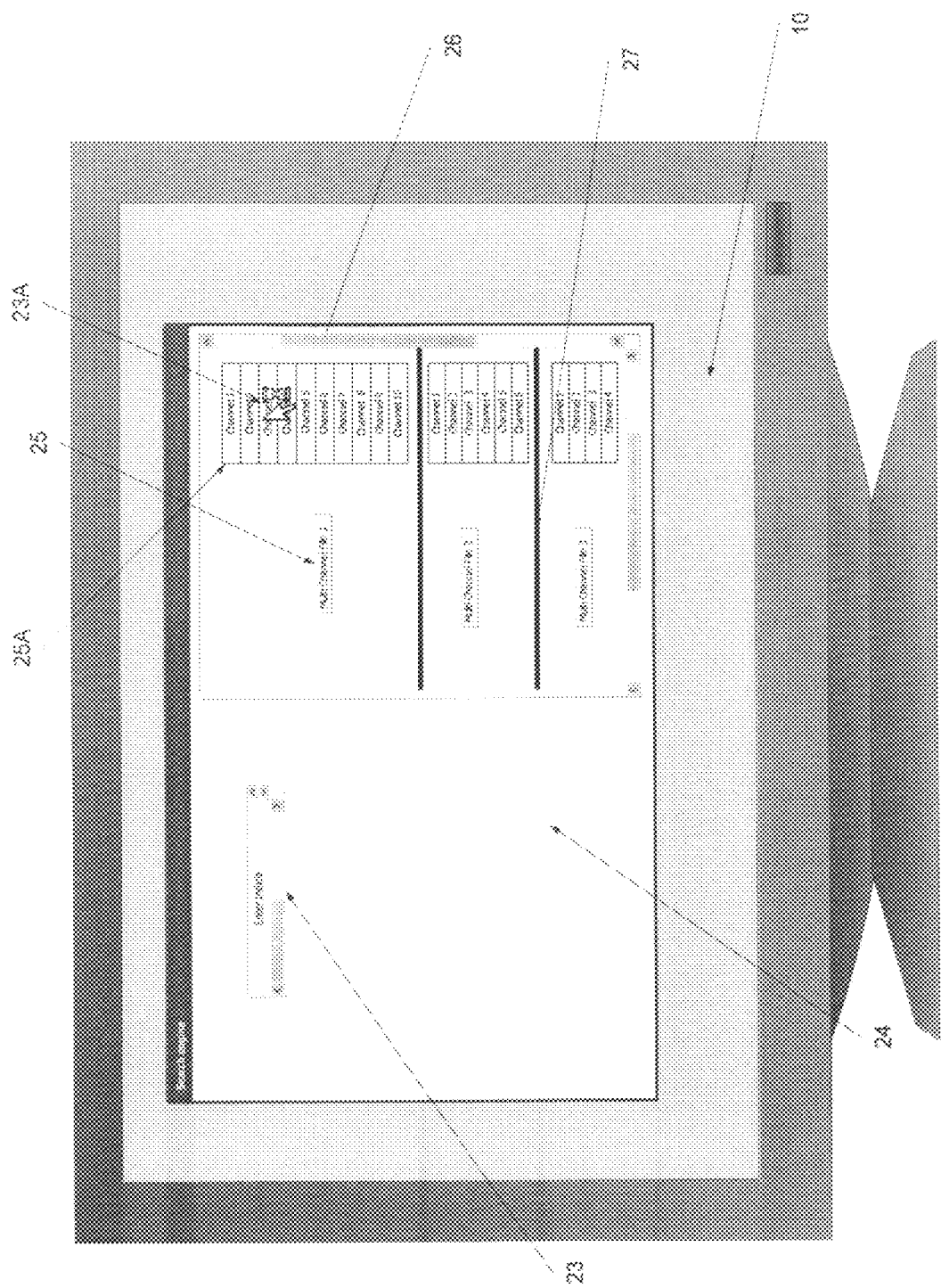
FIG. 9 is an exemplary illustration of a subscriber application screen display according to an embodiment of the present invention.

Reference is now made to FIG. 9 that is an exemplary illustration of a screen display and an interface of the subscriber application according to an embodiment of the present invention. FIG. 9 depicts a common computer screen 10, which displays a graphical user interface (GUI) 24. The GUI provides users the ability to interface with the subscriber applications search engine. The GUI displays a text box 23 that provides users the ability to interface with the search engine, inputting titles of the requested multiple layer media items for the search engine to look for. The GUI further displays a list box 26 that displays titles of multiple layer media items 25 25A which match the users' inputted indicia. As described above, a mouse is connected to a computing unit that allows the user to move an input pointer 23A over the display and to make selections.

The display 10 controls the search engine tasks. Users can enter a title of a requested media item to the text box 23 and the search engine will perform a search accordingly. Subsequently, the search engine retrieves links to channels of multiple layer media items that matches the user's request. Each channel represents a different layer.

Preferably, the search engine generates links. The GUI 24 displays the generated links. Each link facilitates access to channels of multiple layer media items 25A which where retrieved by the search engine according to the user request. Each links allows channels of multiple layer media items to be transferred to subscriber applications via the communication networks. The generated links 26 allows the user to choose specific channels of the multiple layer media items 25 to access and remix.

Preferably, the links are displayed in clusters. Each cluster consists of channels from one media item. A scatter 27 is placed between each cluster. Accordingly, the user can remix channels from different media items that match his request. Using this preferred embodiment, users can choose channels from different multiple layer media items which store the same media piece, and remix them together. Thus, users can remix channels from different recordings of different performers and output, based thereupon, a new multiple layer media item that remixes the channels.

Noticeably, channels which were recorded separately from one another may not be synchronized. Preferably, the separately recorded channels can be synchronized using the mixing module.

Figure 10:
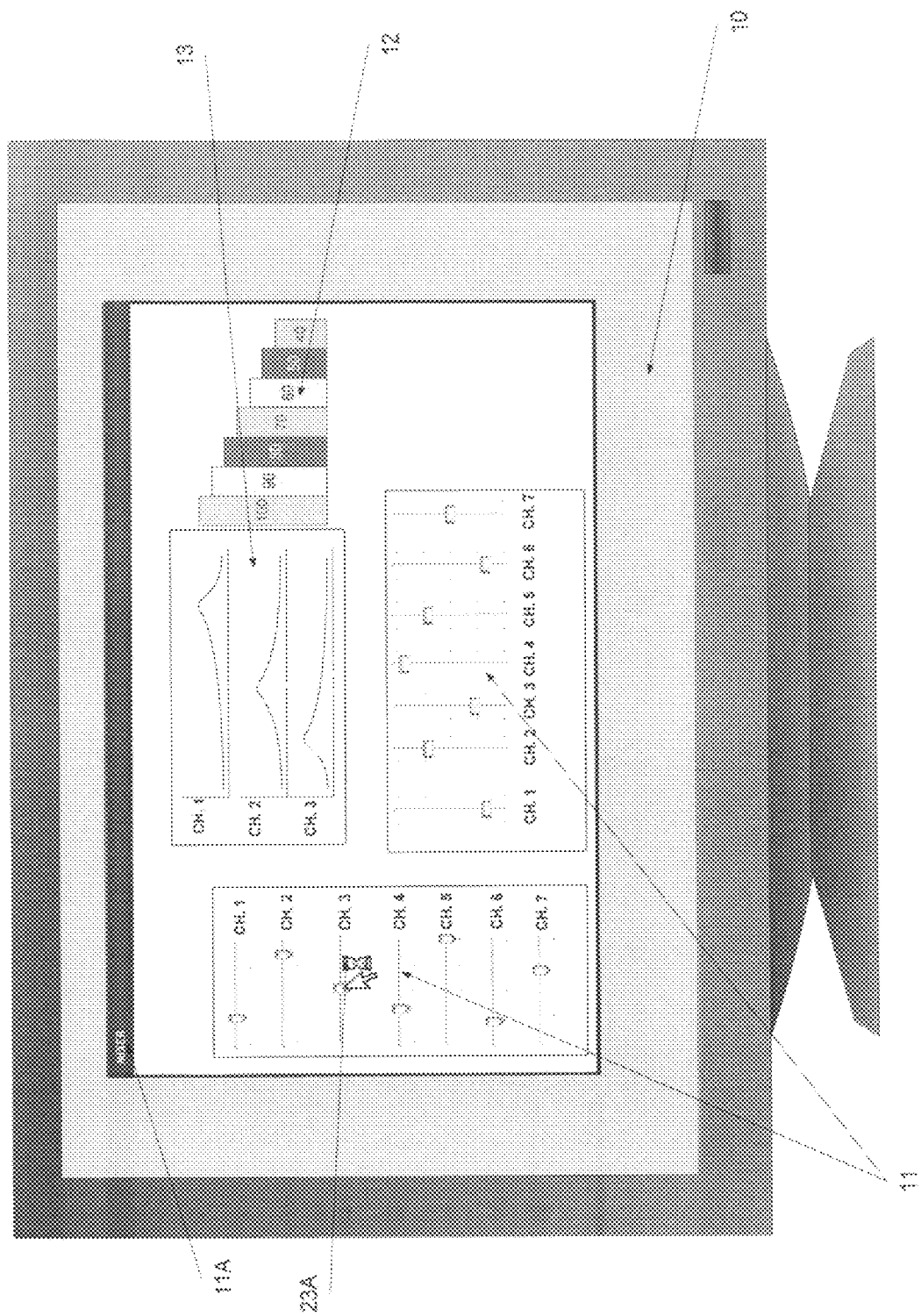
FIG. 10 is another exemplary illustration of a subscriber application screen display according to an embodiment of the present invention.

Reference is now made to FIG. 10 which is an exemplary illustration of a screen display of the subscriber application according to an embodiment of the present invention. The display 10 is as in FIG. 9 above, however FIG. 10 depicts a graphical user interface (GUI) 11A that provides the user with the ability to interface with a mixer module. The GUI displays a set of sliders 11, each slider provides the user the ability to edit a related channel, and a graphical display 12 13 of each channel that can be used to monitor the displayed channels. The user can use the input pointer 23A to control the sliders 11. Each channel represents a different layer.

Using the aforesaid preferred embodiment of the present invention, users can edit each channel separately using related slider 11. The user can move each slider 11 to adjust channel separately. For example, slider 11 can be used to adjust minimum and maximum thresholds of a specific channel or to affect the relative volume or gain of the specific channel. Users can use the graphic displays to monitor the editing of each chosen audio channels 13. Preferably, subscriber applications include a relative display of chosen channels that allows the user to compare between different characters of the mixed channels 12.

The graphic mixer described allows the user to edit channels separately, based upon a graphic feedback of each channel, creating remixes accordingly.

Figure 11:
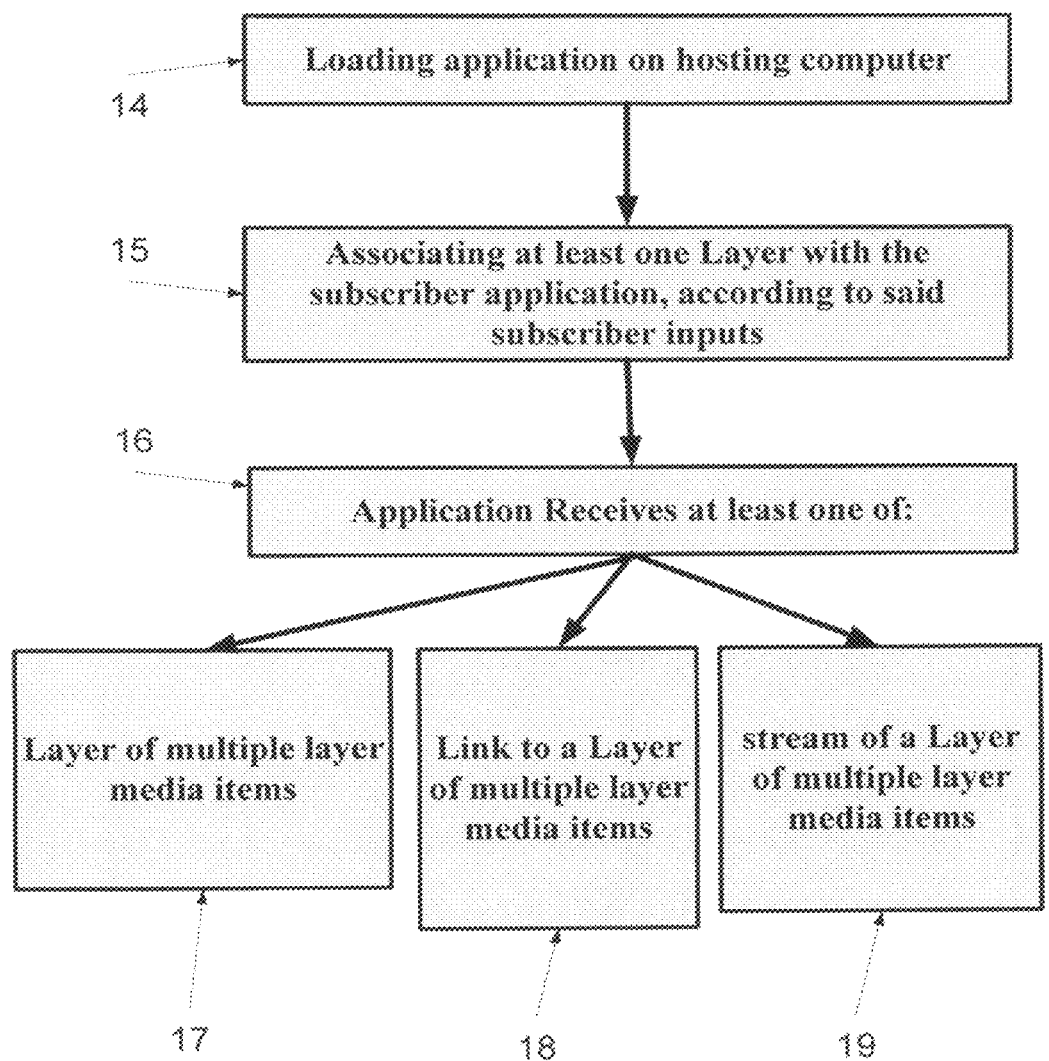
FIG. 11 is a flowchart of an exemplary method according to an embodiment of the present invention for the delivering of multiple channels audio data file to a subscriber application.

FIG. 11 is a flowchart of an exemplary method according to a preferred embodiment of the present invention for facilitating access to layered media items for subscriber applications via a communication network.

As shown, in step 14, the subscriber application is loaded on the hosting computing unit. The subscriber application is capable of communicating with the media database through a communication network. In step 15, the system associates channels of a layered media items, each channel related to a different layer, with the subscriber application, according to the subscriber indicia. In step 15 the system searches for a media database according to the user's definitions, providing the user with access to those chosen layered media items. In the following step 16, the subscriber application can access the layered media items. Now the user can download digital copies of the channels of layered media items 17, or receive a direct stream of channels of layered media items 19 or receive links to the channel of layered media items 18.

If users receive a digital copy of the layered media items through the subscriber application, they can store copies of the chosen channels on the subscriber application computing unit memory and edit the stored item using the mixing module. If the user receives a link or a stream he can only play the chosen channels.

Figure 12:
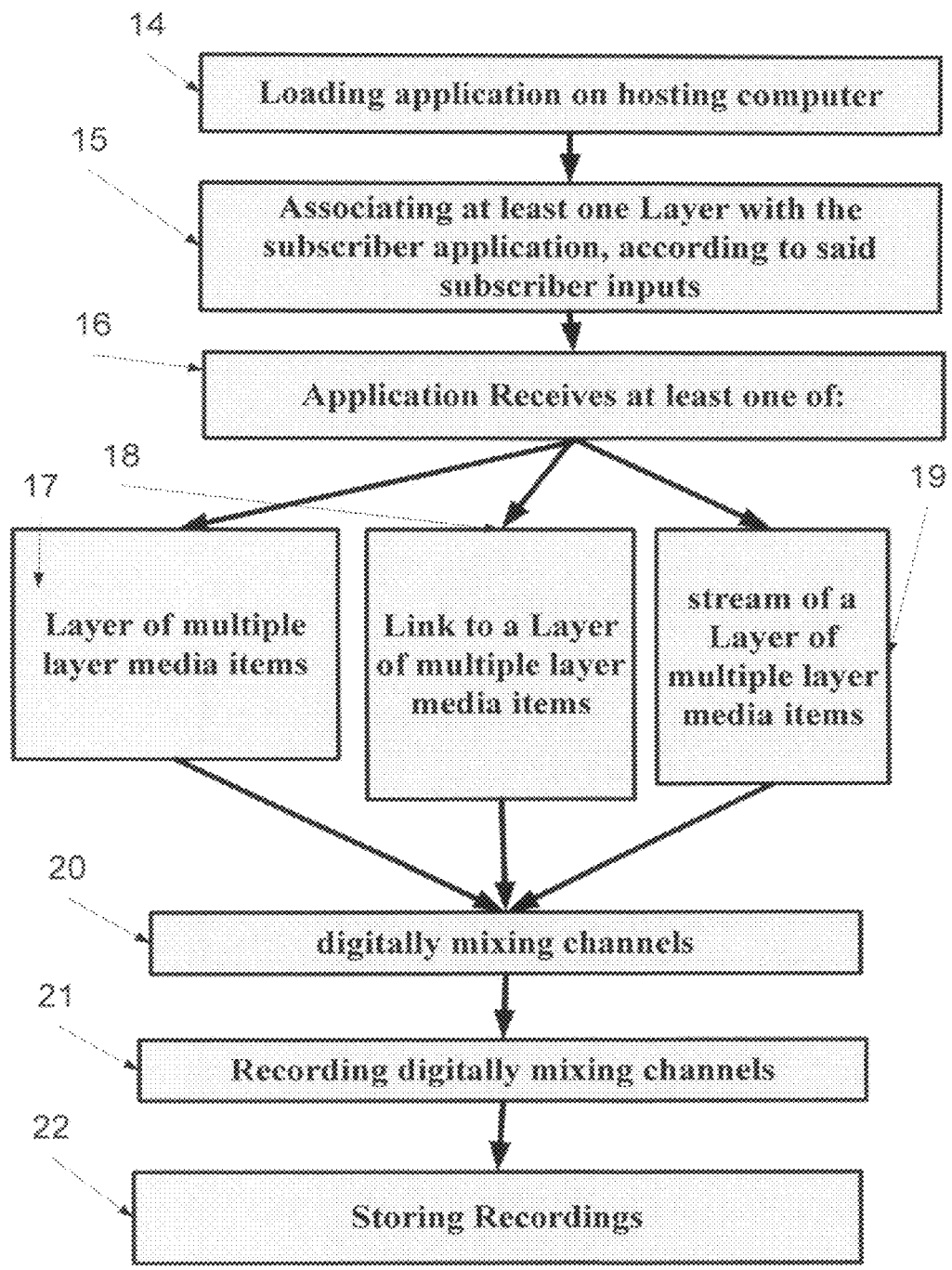
FIG. 12 is another flowchart of an exemplary method according to another embodiment of the present invention for the facilitating access to multiple channels audio data file to a subscriber application.

Reference is now made to FIG. 12, which is a flowchart of an exemplary method according to another preferred embodiment of the present invention. As shown, steps 14 to 19 are as in FIG. 11 above, however the present embodiment further comprises steps 20 to 22. This embodiment describes a method for facilitating subscribers with the ability to access and edit channels of layered media items via a communication network using a digital mixer module located on the hosting computing unit memory.

In step 20, the system digitally mixes channels of layered media items. Based upon the mixing the system outputs digital media signals that represent the remixed channels. The mixing is done using the hosting computing unit processor and the output is controlled by the hosted subscriber application. In the subsequent step, the outputted mixed digital media signal can be digitally recorded. Step 21 is followed by a step of storing the recordings as media files 22 either on media database or on the subscriber hosting computing unit memory.

Figure 13:
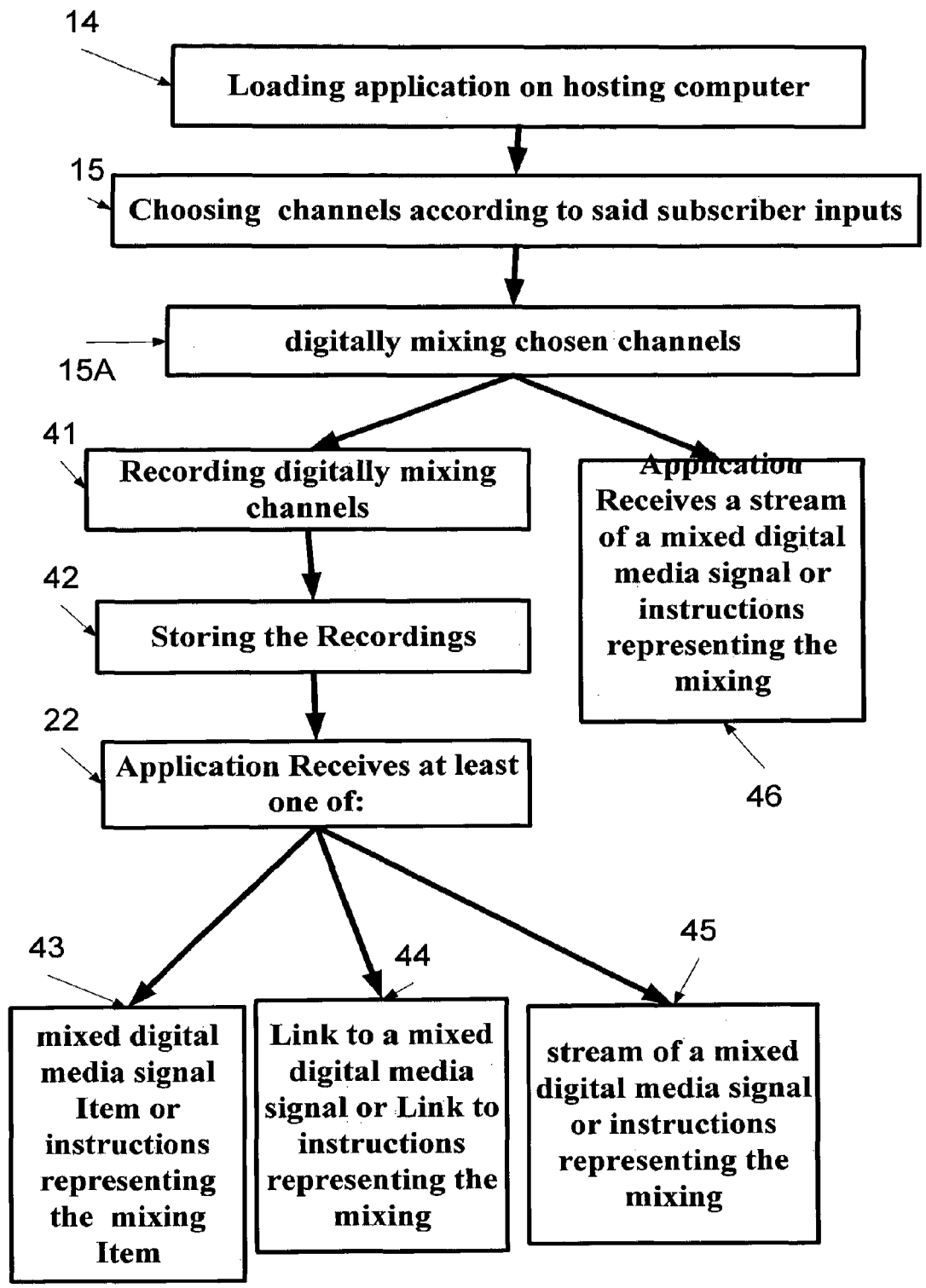
FIG. 13 is another flowchart of an exemplary method according to another embodiment of the present invention for the delivering of digitally mixed audio data to a subscriber application.

Reference is now made to FIG. 13, which is a flowchart of an exemplary method according to another preferred embodiment of the present invention. As shown, in step 14, similarly to the method described in FIG. 11 and FIG. 12 the subscriber application is running on hosting computing unit. In addition, the subscriber application is also capable of communicating with the media database. However, in the subsequent step 15, the method enables the user to choose channels of the layered media items by submitting indicia to the subscriber application. The system associates channels of layered media items according to the user indicia, enabling remote access to the channels from the subscriber application. In the subsequent step 15A the chosen channels are digitally mixed on the server memory by a mixing module.

Now, FIG. 13 depicts two scenarios. In the first scenario, as shown at 46, during the following step 46, the application receives a stream of a mixed digital media signal or instructions representing the mixing. According to the first scenario the user receives the mixed signals as an output feed and therefore cannot store the outcome.

In the second scenario, step 15A is followed by step 41 of recording the outputted mixed digital media signal or recording the instructions representing the mixing as carried out. Step 41 is followed by a step of storing the recordings as media files 42 on the media database or on a designated server.

According to this scenario the system can store a copy of the mix on the server.

A method according to the present embodiment of the invention can facilitate the system operator with the ability grant different rights to different users. Since the mixing and recording is done on the operator server and not on the user server the operator can control the outputs of the system, enabling specific users with the rights to listen to or to view the layered media items and others with the rights to edit the layered media items on a remote server or to copy the layered media item or the remix to the memory of their own computing unit.

The method described in FIG. 13 facilitates mixing independently from the subscriber application, transferring only the outcome of the digital mixing process to the subscriber application. This embodiment allows the system operator more control on the system outputs and abilities, allowing control on usage and access rights regarding the layered media items and regarding the mixing thereof. In this manner, the system operator can bestow different usage and access rights to subscribers and non-subscribers. For example, the system operator can grant the right to download the remixes of the layered media items only to subscribers. Accordingly, as shown in step 46, non-subscribed users can be restricted such that they only receive a stream of their remixes. Accordingly, the non-subscribed users may listen to their remixes, but cannot download their remixes to remotely located personal computing unit. Hence, the operator creates an incentive for them to become subscribers in order to gain full control of their creations.

It is expected that during the life of this patent many relevant devices and systems will be developed and the scope of the terms herein, particularly of the terms mixing, communication network, communication link and computing unit are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for facilitating access to multiple audio layer items over a communication network comprising:
    a network accessible media database, connected to a communication network, which stores multiple audio layer items each having a plurality of separate and different audio layers which are independently accessible; and
    at least one subscriber application for receiving a user selection of at least some of said multiple audio layer items, connecting to said media database, and receiving at least some of said plurality of audio layers;
    wherein said at least one subscriber application having a mixing module which digitally synchronizes and mixes said at least some audio layers to create an audio remix representing a mixed digital audio signal.

2. The system of claim 1, wherein each layer of each said multiple audio layer items is selected from a group consisting of: an audio stream and a sound wave.

3. The system of claim 1, wherein said subscriber application is hosted by a member selected from a group consisting of: a personal computer, personal digital assistant (PDA), and a cellular phone.

4. The system of claim 1, further comprising a subscribers listing database being usable for storing subscribers' information records comprising an access and usage rights of respective subscribers regarding each layer of said multiple audio layer items.

5. The system of claim 1, further comprising a layer rights database being usable for storing a plurality of right records, each one of said plurality of right records comprises an access and usage rights regarding a respective layer of an multiple audio layer items of said multiple audio layer items, said media database is operative for facilitating access of said subscriber applications to said multiple audio layer items according to respective subscribers' information.

6. The system of claim 5, wherein said layer rights database is adapted to be connected to a Digital Right Management (DRM) unit, said DRM unit being adapted to enforce said access and usage rights.

7. The system of claim 1, wherein said subscriber application further comprising a user module configured for providing at least one of a user selected audio layer and a user recorded audio layer, said mixing module digitally synchronizes between said user selected audio layer and said user recorded audio layer and said at least some of said plurality of audio layers to create said mixed digital audio signal.

8. The system of claim 1, wherein said network accessible media database is adapted to be connected to a reconstruction module operative for receiving a mixed digital audio signal, outputting reconstructed channels based thereon and storing them as multiple audio layer items.

9. The system of claim 7, wherein said subscriber application further comprises a digital display operative for displaying graphic interfaces, said graphic interfaces are operative for facilitating said subscribers with the ability to control said mixing module.

10. The system of claim 7, wherein said subscriber application is operative for communicating with an independent audio source;
    wherein said mixing module is operative for mixing layers of said multiple audio layer items with channels from said independent audio source.

11. The system of claim 7, wherein said subscriber applications being usable for uploading said remix to said media database, said media database is usable for storing said uploaded remix.

12. The system of claim 1, further comprising a layer rights database being usable for storing a plurality of right records, each one of said plurality of right records comprising an access and usage rights regarding a respective layer of a multiple audio layer items of said multiple audio layer items.

13. The system of claim 12, wherein said usage rights are all or some of recording, fixating, listening, redistributing, viewing or editing.

14. The system of claim 1, wherein said subscriber application further comprises a search engine operative for searching said media database according to an indicia.

15. The system of claim 1, wherein said member downloads said plurality of separate and different audio layers from said network accessible media database to its memory; wherein said mixing module performs said mixing locally on a client terminal.

16. A subscriber application for facilitating access to multiple audio layer items via a communication network, comprising:
    a port for communicating with a media database via a communication network; and
    an interface configured to allow a user to select a multiple audio layer item from a plurality of multiple audio layer items each having a plurality of separate and different audio layers and to address separately at least some of said plurality of separate and different audio layers of said selected multiple audio layer item; and a mixing module configured for digitally synchronizing and mixing at least some of said plurality of audio layers to create locally, in the memory of a computing unit, a remix representing a mixed digital audio signal.

17. The subscriber application of claim 16, further comprising a display operative for graphically displaying of said at least some audio layers to allow independent adjustment for each one them.

18. The subscriber application of claim 16, wherein said subscriber application further comprises a mixing module configured for digitally mixing said at least some audio layers and outputting based thereon a remix.

19. A remote sale system for facilitating access to layered media items, said remote sale system comprising:
  a connecting device for connecting a plurality of customer computers located at remote sites to a central computer associated with a database of a plurality of layered audio items each comprising a plurality of separate and different audio layers;
  a management device for receiving, via a network from a plurality of remote client terminals of a plurality of potential customers, a plurality of requests each to separately access at least one of a plurality of audio layers of a selected layered audio item of said plurality of layered audio items and providing, in response to each said request, a separate access to respective said at least one audio layer of said selected layered audio item, each said audio layer is associated with a price; and
  a purchasing device for debiting said plurality of potential customers according to said separate access and respective said price.

20. The remote sale system of claim 19, wherein said management device allowing customers to access and use said layered media items according to respective licenses.

21. A method of conducting a commercial activity regarding layered media files, comprising:
  a) collecting a plurality of layered media files each having a plurality of separate and different audio layers;
  b) facilitating each of a plurality of potential customers with the ability to separately access each said separate and different audio layer via a client terminal and to create a remix by digitally mixing and synchronizing said separately accessed and different audio layer locally on said client terminal; and
  c) debiting each one of said plurality of potential customers according to said access.

22. The method of claim 21, further comprising a step d) of crediting at least one copyright owner according to said access, wherein said crediting is done according to the relative ownership share of said at least one copyright owner in said accessed layered media files.

23. The method of claim 22, wherein said crediting of step (d) is done according to licensing agreement between a system operator and said at least one copyright owner.

24. A method of creating a remix locally at a subscriber application by facilitating access to multiple audio layer items for subscribers via communication network, comprising:
  providing a media database comprising a plurality of multiple audio layer items each having a plurality of separate and different audio layers such that each said audio layer is independently accessible as a separate audio channel;
  providing at least one subscriber application capable of communicating with said media database;
  associating at least one of said multiple audio layer items with at least one of said subscriber applications, according to respective subscriber inputs;
  receiving a selection indicative of said at least some separate and different audio layers of at least one of said multiple audio layer items from a client terminal; and
  providing independent access and usage to said at least some separate and different audio layers to create a remix representing a mixed digital media signal by digitally mixing and synchronizing said at least some separate and different audio layers.

25. The method of claim 24, further comprising a step of receiving by said subscriber application at least one of: channel of said multiple audio layer items, stream of a channel of said of multiple audio layer items, and a link to a channel of said multiple audio layer items.

26. The method of claim 24, further comprising a step of digitally mixing said received channels and outputting based thereon a remix representing mixed digital media signal.

27. The method of claim 24, further comprising allowing said at least one subscriber application to download said independently accessed audio layers from said network accessible media database to the memory of a respective hosting computing unit.

28. A system for facilitating access to multiple audio layer items over a communication network comprising:
  a network accessible media database, connected to a communication network, which stores a plurality of multiple audio layer items such that each layer of each said audio layer item is independently accessible; and
  at least one subscriber application for receiving a user selection of at least one of said multiple audio layer items, connecting to said media database, and receiving said first multiple audio layer item, said at least one subscriber application having a mixing module configured for digitally synchronizing and mixing at least one selected audio layer of said selected multiple audio layer item to create locally an audio remix representing a mixed digital audio signal.

* * * * *